United States Patent
Kim

(10) Patent No.: US 9,699,358 B2
(45) Date of Patent: Jul. 4, 2017

(54) IMAGE PROCESSING APPARATUS AND METHOD FOR CORRECTING IMAGE BASED ON EDGE DETECTION

(71) Applicant: SAMSUNG ELECTRONICS CO., LTD., Suwon-si (KR)

(72) Inventor: Yun-Tae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/877,221

(22) Filed: Oct. 7, 2015

(65) Prior Publication Data
US 2016/0212363 A1     Jul. 21, 2016

(30) Foreign Application Priority Data

Jan. 20, 2015 (KR) .................. 10-2015-0009183

(51) Int. Cl.
| | |
|---|---|
| H04N 5/365 | (2011.01) |
| H04N 5/14 | (2006.01) |
| G06T 5/00 | (2006.01) |
| G06T 7/13 | (2017.01) |

(52) U.S. Cl.
CPC ............ H04N 5/142 (2013.01); G06T 5/002 (2013.01); G06T 7/13 (2017.01); *G06T 2207/20021* (2013.01); *G06T 2207/20192* (2013.01)

(58) Field of Classification Search
CPC . G06T 2207/20192; G06T 2207/20021; G06T 5/002
See application file for complete search history.

(56) References Cited

U.S. PATENT DOCUMENTS

| | | | | |
|---|---|---|---|---|
| 2005/0238249 A1* | 10/2005 | Okamura | ............ | H04N 5/3658 382/274 |
| 2006/0020203 A1* | 1/2006 | Tamura | ............ | G06T 5/20 600/437 |
| 2011/0116726 A1* | 5/2011 | Hosaka | ............ | G06T 5/003 382/255 |
| 2012/0045122 A1* | 2/2012 | Gomi | ............ | G06K 9/00624 382/165 |
| 2012/0082370 A1* | 4/2012 | Yasukawa | ............ | G06T 7/0028 382/154 |

(Continued)

FOREIGN PATENT DOCUMENTS

| | | |
|---|---|---|
| JP | 2008-505675 A | 2/2008 |
| KR | 10-2013-0013142 A | 2/2013 |

*Primary Examiner* — Amy Hsu
(74) *Attorney, Agent, or Firm* — Sughrue Mion, PLLC

(57) ABSTRACT

Disclosed herein are an image processing apparatus, an image capturing apparatus, an image processing method, and a method of controlling an image capturing apparatus. The image processing apparatus includes: an input unit through which an image is input, a correction value decider configured to detect an edge of the image by applying at least one directional filter that is alignable in a direction with respect to the image, to calculate a mean value of a plurality of pixel values of a plurality of pixels that correspond to the edge, and to determine a correction value that corresponds to each pixel of the image according to the mean value of the plurality of pixel values, and an image corrector configured to apply the correction value to the image in order to correct the image.

18 Claims, 21 Drawing Sheets

(56) References Cited

U.S. PATENT DOCUMENTS

| | | | |
|---|---|---|---|
| 2012/0230601 A1* | 9/2012 | Iso | G06T 5/002 382/269 |
| 2012/0249959 A1* | 10/2012 | You | A61B 3/12 351/206 |
| 2013/0094725 A1* | 4/2013 | Gulsun | G06T 7/162 382/128 |
| 2013/0121611 A1* | 5/2013 | Moriya | G06T 3/403 382/266 |
| 2015/0178946 A1* | 6/2015 | Krishnaswamy | G06K 9/46 345/582 |

* cited by examiner

IMAGE PROCESSING APPARATUS AND METHOD FOR CORRECTING IMAGE BASED ON EDGE DETECTION

CROSS-REFERENCE TO RELATED APPLICATION

This application claims priority from Korean Patent Application No. 10-2015-0009183, filed on Jan. 20, 2015 in the Korean Intellectual Property Office, the disclosure of which is incorporated herein by reference in its entirety.

BACKGROUND

1. Field

Exemplary embodiments relate to an image processing apparatus, an image capturing apparatus, an image processing method, and a method of controlling the image capturing apparatus.

2. Description of the Related Art

An image capturing apparatus means an apparatus that can collect information about the inside or outside of a subject, and acquire a predetermined image based on the collected information.

The image capturing apparatus can acquire information about the inside or outside of a subject by collecting visible light, infrared light, radiation, ultrasonic waves, microwaves, and/or Free Induction Decay (FID) signals that can be acquired according to a Magnetic Resonance (MR) phenomenon.

Imaging apparatuses include a camera, an infrared camera, a radiography apparatus, an ultrasonic imaging apparatus, and a Magnetic Resonance Imaging (MRI) apparatus.

The image capturing apparatus can correct the acquired image by adjusting the contrast, sharpness, brightness, or the like of the entirety or a part of the acquired image. In addition, the image capturing apparatus can display still images or moving images through a display device. As necessary, the image capturing apparatus can display both a still image and a moving image.

SUMMARY

Therefore, it is an aspect of one or more exemplary embodiments to provide an image processing apparatus, an image capturing apparatus, an image processing method, and a method of controlling the image capturing apparatus, which are capable of enhancing and improving edges included in an image while maintaining the brightness of the image.

Additional aspects of the exemplary embodiments will be set forth in part in the description which follows and, in part, will be apparent from the description, or may be learned by practice of the exemplary embodiments.

In accordance with one aspect of one or more exemplary embodiments, an image processing apparatus includes: an input device via which an image is input; a correction value decider configured to apply at least one directional filter that is alignable in a direction with respect to the image, in order to detect an edge of the image, to calculate a mean value of a plurality of pixel values of a plurality of pixels that correspond to the edge, and to determine a correction value that corresponds to each pixel of the image based on the calculated mean value; and an image corrector configured to apply the determined correction value to the image in order to correct the image.

The at least one directional filter may include a Gabor filter.

The correction value decider may be further configured to apply a plurality of directional filters which are aligned in different respective directions with respect to the image in order to acquire the plurality of pixels that correspond to the edge.

The correction value decider may be further configured to divide the image into a plurality of areas, and to apply the at least one directional filter to each of the plurality of areas in order to detect the edge of the image.

The correction value decider may be further configured to determine the correction value as varying inversely with respect to the calculated mean value such that the correction value is determined to be smaller when the calculated mean value is greater, and the correction value is determined to be greater when the calculated mean value is smaller.

The correction value decider may be further configured to determine a greater correction value for at least a first pixel of the image as a pixel value of the at least first pixel is greater, and to determine a smaller correction value for at least a second pixel of the image as a pixel value of the at least second pixel is smaller.

The correction value decider may be further configured to apply the correction value to the corresponding pixel of the image in order to acquire an output image.

The image processing apparatus may further include a noise processor configured to remove noise from the image or from the edge of the image.

The noise processor may be further configured to reduce a relatively smaller pixel value from among the plurality of pixel values, and to extend a relatively greater pixel value from among the plurality of pixel values.

The noise processor may be further configured to perform speckle noise filtering.

In accordance with another aspect of one or more exemplary embodiments, an image processing method includes: applying at least one directional filter that is alignable in a direction with respect to an image in order to detect an edge of the image; acquiring a plurality of pixels that correspond to the edge; calculating a mean value of a plurality of pixel values of the plurality of pixels, and determining a correction value that corresponds to the plurality of pixels based on the calculated mean value; and applying the determined correction value to the image in order to correct the image.

The at least one directional filter may include a Gabor filter.

The applying the at least one directional filter may include applying a plurality of directional filters which are aligned in different respective directions with respect to the image in order to acquire the plurality of pixels that correspond to the edge.

The applying the at least one directional filter may include dividing the image into a plurality of areas, and applying the at least one directional filter to each of the plurality of areas in order to detect the edge of the image.

The determining the correction value may include determining the correction value as varying inversely with respect to the calculated mean value such that the correction value is determined to be smaller when the calculated mean value is greater, and the correction value is determined to be greater when the calculated mean value is smaller.

The determining the correction value may include determining a greater correction value for at least a first pixel of the image as a pixel value of the at least first pixel is greater, and determining a smaller correction value for at least a second pixel of the image as a pixel value of the at least second pixel is smaller.

The applying the correction value to the image may include applying the correction value to the corresponding pixel of the image in order to acquire an output image.

The image processing method may further include removing noise from the image or from the edge of the image.

The removing the noise may include reducing a relatively smaller pixel value from among the plurality of pixel values, and extending a relatively greater pixel value from among the plurality of pixel values.

The removing the noise may include performing speckle noise filtering.

In accordance with another aspect of one or more exemplary embodiments, an image capturing apparatus includes: a capturing unit configured to acquire an image of a subject; and an image processor configured to apply a directional filter that is alignable in a direction with respect to the image in order to detect an edge of the image, to acquire a mean value of a plurality of pixel values that correspond to the detected edge, to determine a correction value based on the acquired mean value, and to apply the determined correction value to the image in order to correct the image.

The capturing unit may acquire the image of the subject using at least one from among visible light, infrared light, radiation, ultrasonic waves, microwaves, and a Free Induction Decay (FID) signal induced according to a Magnetic Resonance (MR) phenomenon.

In accordance with another aspect of one or more exemplary embodiments, a method of controlling an image capturing apparatus includes: at the image capturing apparatus, acquiring an image of a subject by using at least one from among visible light, infrared light, radiation, ultrasonic waves, microwaves, and a FID signal induced according to a MR phenomenon; at the image capturing apparatus, applying a directional filter that is alignable in a direction with respect to the image in order to detect an edge of the image, and to acquire a plurality of pixel values that correspond to the detected edge; at the image capturing apparatus, acquiring a mean value of the plurality of pixel values; at the image capturing apparatus, determining a correction value for the image by using the acquired mean value; and at the image capturing apparatus, applying the determined correction value to the image in order to acquire an output image.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
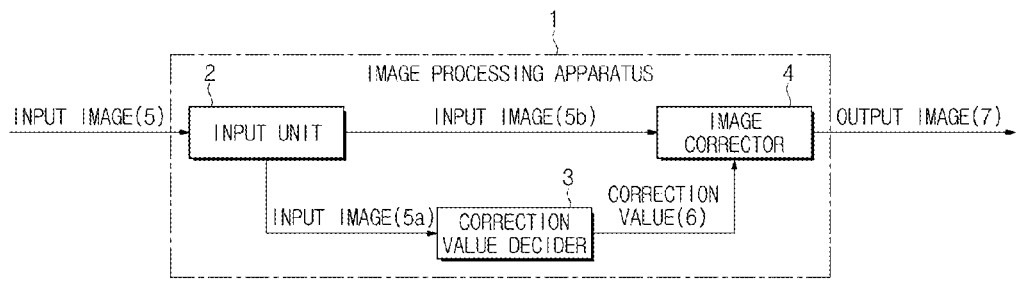
FIG. 1 is a block diagram of an image processing apparatus, according to an exemplary embodiment.

Reference will now be made in detail to exemplary embodiments, examples of which are illustrated in the accompanying drawings, wherein like reference numerals refer to like elements throughout.

Hereinafter, an image processing apparatus will be described with reference to FIGS. 1 to 13.

FIG. 1 is a block diagram of an image processing apparatus, according to an exemplary embodiment.

Referring to FIG. 1, an image processing apparatus 1 may receive an input image 5, and correct the input image 5 in order to create an output image 7.

The image processing apparatus 1 may include an input unit (also referred to herein as an "input device") 2, a correction value decider 3, and an image corrector 4.

The input unit 2 may receive the input image 5. The input image 5 received by the input unit 2 may be transferred to the correction value decider 3 and the image corrector 4.

The input image 5 may be an image that is subject to image-processing by the image processing apparatus 1. In particular, the input image 5 may include raw data that is not subject to image processing, an image created using raw data, and/or an image obtained by image-processing the entirety or a part of an image created using raw data. However, the input image 5 is not limited to the aforementioned images, and may include other various kinds of images.

The input image 5 may be acquired using any of various means. For example, the input image 5 may include an image created by electrical signals acquired based on visible light, infrared light, radiation, ultrasonic waves, microwaves, and/or Free Induction Decay (FID) signals that can be acquired according to a Magnetic Resonance (MR) phenomenon.

Figure 2:
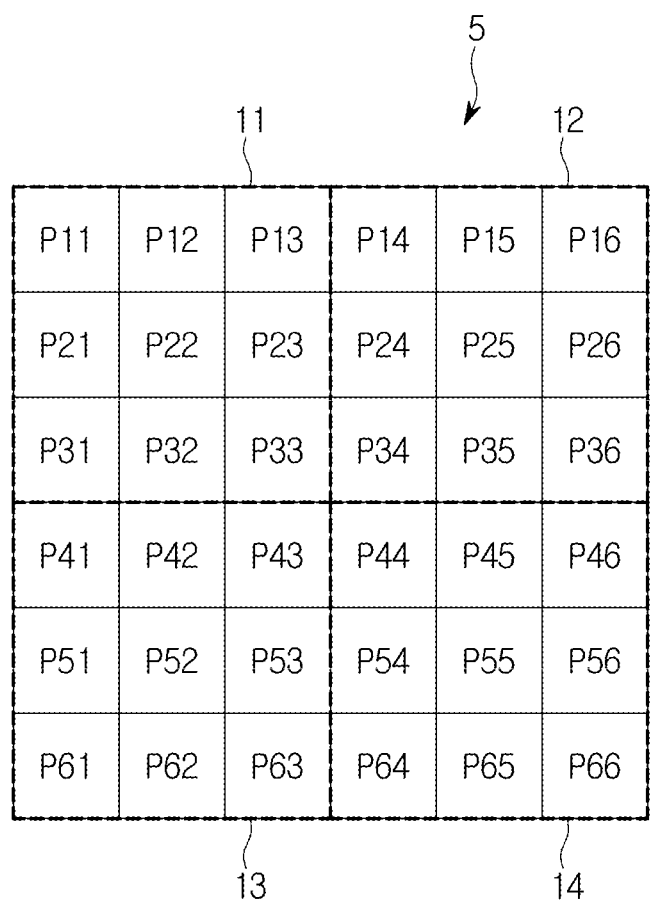
FIG. 2 shows an example of an input image.

As shown in FIG. 2, the input image 5 may be composed of a plurality of pixels (or picture elements) P11 to P66, wherein the term "pixel" refers to a minimum unit for forming an image, and the number of pixels determines the resolution of an image. For example, the input image 5 may have various magnifications according to arrangements of the pixels P11 to P66. For example, in the input image 5, the pixels P11 to P66 may be arranged with a horizontal length of 720 pixels and a vertical length of 1280 pixels. In this case, the input image 5 may have resolution of 1280×720.

Each pixel P11 to P66 may have a respective pixel value that is predetermined image information. The pixel value may include information about the color, brightness value, and/or transparency of the corresponding pixel.

The brightness value may be a value expressing a degree of brightness of light that is represented by the pixel. The brightness of light may be classified into a plurality of levels according to a predetermined criterion. For example, a brightness value of an arbitrary pixel may be set to an integer value between 0 and 256. A pixel having a brightness value of 0 may be represented with a bright color, and a pixel having a brightness value of 255 may be represented with a dark color, and vice versa. Hereinafter, for convenience of description, an example in which a pixel having the greater brightness value is represented with a darker color will be described.

According to an exemplary embodiment, the input image 5 input to the input unit 2 may be an image amplified by an amplifier (not shown), or converted by an Analog-Digital Converter (ADC, not shown).

The input unit 2 may include any of various input/output (I/O) interfaces provided in a computing device, such as a circuit mounted on a Printed Circuit Board (PCB), one or more input pins provided in a processor, and various input ports, or a communication module configured to transmit/receive data to/from an external device. The I/O interfaces provided in the computing device may include, for example, a Universal Serial Bus (USB). The communication module may include a communication chip, an antenna, and/or network equipment to connect to a wired/wireless network to transmit/receive data to/from an external device. Also, the input unit 2 may be any device that is capable of receiving image data from an external device.

The correction value decider 3 may receive the input image 5 (also, denoted as reference number 5a) transferred from the input unit 2, and calculate a correction value 6 using the input image 5a. In particular, the correction value decider 3 may apply a predetermined filter to the input image 5a in order to detect an edge that exists in the input image 5a, and calculate a correction value 6 based on the detected edge and the input image 5a. Herein, the predetermined filter may be a directional filter. The directional filter may be a Gabor filter. The correction value decider 3 may be implemented with one or more processors, such as a Central Processing Unit (CPU) or a Graphic Processing Unit (GPU).

Figure 3:
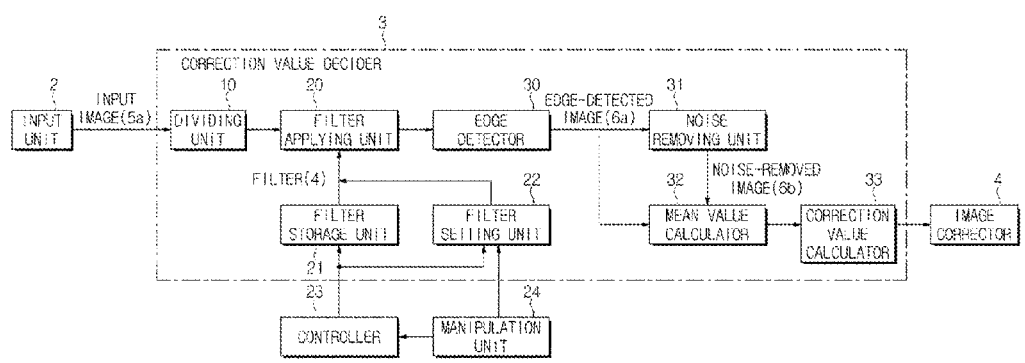
FIG. 3 is a block diagram showing an exemplary embodiment of a correction value decider of an image processing apparatus.
Figure 4:
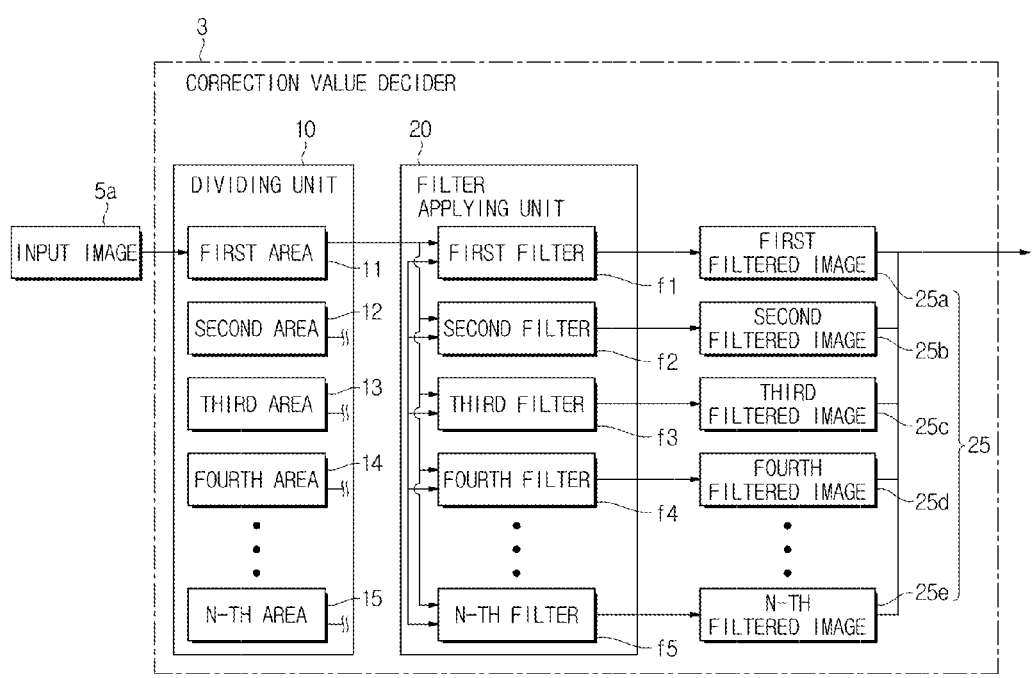
FIG. 4 is a block diagram showing details relating to an exemplary embodiment of a correction value decider.

FIG. 3 is a block diagram showing an exemplary embodiment of the correction value decider 3 of the image processing apparatus 1, and FIG. 4 is a block diagram showing details of an exemplary embodiment of the correction value decider 3.

Referring to FIG. 3, the correction value decider 3 may include a dividing unit (also referred to herein as a "divider") 10, a filter applying unit (also referred to herein as a "filter applier") 20, an edge detector 30, a noise removing unit (also referred to herein as a "noise remover") 31, a mean value calculator 32, and a correction value calculator 33. However, at least one of the dividing unit 10, the filter applying unit 20, the edge detector 30, the noise removing unit 31, the mean value calculator 32, and the correction value calculator 33 may be omitted according to exemplary embodiments.

Further, the dividing unit 10, the filter applying unit 20, the edge detector 30, the noise removing unit 31, the mean value calculator 32, and the correction value calculator 33 of the correction value decider 3 may be physically or logically separated from each other. In this aspect, the dividing unit 10, the filter applying unit 20, the edge detector 30, the noise removing unit 31, the mean value calculator 32, and the correction value calculator 33 may be implemented by a plurality of processors which are physically separated, or by a single processor.

The dividing unit 10 may receive the input image 5a from the input unit 2, and divide the input image 5a into a plurality of areas 11, 12, 13, and 14 as shown in FIG. 2.

As shown in FIG. 2, the input image 5a may be composed of the plurality of pixels P11 to P66, and may be divided into the plurality of areas 11, 12, 13, and 14 such that each of the areas 11, 12, 13, and 14 includes at least one of the plurality of pixels P11 to P66.

The dividing unit 10 may divide the input image 5a into N areas 11, 12, 13, and 14 according to a user's selection or a predetermined setting. Herein, the predetermined setting may include at least one of the number of areas, the horizontal width or vertical height of each area, the number of pixels included in each area, and the location of each area. The dividing unit 10 may determine the number of areas, the horizontal width or vertical height of each area, the number of pixels included in each area, and/or the location of each area, according to the input image 5a, and divide the input image 5a according to the result of the determination. In addition, the dividing unit 10 may arbitrarily divide the input image 5a without using any predetermined setting.

According to an exemplary embodiment, the dividing unit 10 may divide the input image 5a in unit of a pixel P11 to P66. In particular, each area 11, 12, 13, and 14 may consist of a pixel.

According to another exemplary embodiment, the dividing unit 10 may divide the input image 5a into first to n-th areas 11, 12, 13, 14, and 15, each area composed of a plurality of pixels, as shown in FIG. 4, wherein n is a natural number greater than or equal to 1. In this aspect, each of the first to n-th areas 11, 12, 13, 14, and 15 may include a plurality of pixels. For example, each of the first to n-th areas 11, 12, 13, 14, and 15 may include 9 pixels arranged in the form of a 3×3 matrix. The first to n-th areas 11, 12, 13, 14, and 15 may have the same size as shown in FIG. 2, or different sizes. Also, a part of the first to n-th areas 11, 12, 13, 14, and 15 may have the same size, and the other part of the first to n-th areas 11, 12, 13, 14, and 15 may have different sizes. That the first to n-th areas 11, 12, 13, 14, and 15 have the same size means that the first to n-th areas 11, 12, 13, 14, and 15 have the same bottom sides and the same heights.

An example in which the dividing unit 10 divides the input image 5a into a plurality of areas has been described above. However, areas that are divided by the dividing unit 10 are not limited to the example shown in FIG. 2. In this aspect, the dividing unit 10 may divide the input image 5a by using one of various methods that can be considered by those of ordinary skill in the art.

According to another exemplary embodiment, the dividing unit 10 may be omitted. If the dividing unit 10 is omitted, the input image 5a may be filtered by the filter applying unit 20, without being divided.

The filter applying unit 20 may filter the input image 5a or the first to n-th areas 11, 12, 13, 14, and 15 of the input image 5a by using one or more directional filters to thus acquire a filtered image 25.

The filter applying unit 20 may apply a single filter f to the input image 5a, or may apply a plurality of predetermined filters f respectively to the first to n-th areas 11, 12, 13, 14, and 15 of the input image 5a.

More specifically, the filter applying unit 20 may apply first to n-th filters f1, f2, f3, f4, and f5, respectively, to the first to n-th areas 11, 12, 13, 14, and 15 of the input image 5a. The first to n-th filters f1, f2, f3, f4, and f5 may be the same kind of filters or different kinds of filters.

According to an exemplary embodiment, the filter applying unit 20 may apply a plurality of different first to n-th filters f1, f2, f3, f4, and f5 received from a filter storage unit 21 (see FIG. 3) or set by a filter setting unit 22 (see FIG. 3), to the input area 5a or the first to n-th areas of the input area 5a. In this case, the plurality of first to n-th filters f1, f2, f3, f4, and f5 may be filters having different directivities, which will be described below.

Referring to FIGS. 3 and 4, the filter applying unit 20 may apply the first to n-th filters f1, f2, f3, f4, and f5 to each of the first to n-th areas 11, 12, 13, 14, and 15 of the input image 5a. In this case, the filter applying unit 20 may apply all or a part of the first to n-th filters f1, f2, f3, f4, and f5 to the area. Accordingly, the filter applying unit 20 may output a plurality of first to n-th filtered images 25a, 25b, 25c, 25d, and 25e for each of the first to n-th areas 11, 12, 13, 14, and 15. More specifically, the filter applying unit 20 may apply the first to n-th filters f1, f2, f3, f4, and f5 to the first area 11 of the plurality of areas 11, 12, 13, 14, and 15 to acquire first to n-th filtered images 25a, 25b, 25c, 25d, and 25e for the first area 11 in correspondence to the number of the filters f1, f2, f3, f4, and f5. Also, the filter applying unit 20 may apply the first to n-th filters f1, f2, f3, f4, and f5 to the second area 12 to acquire other first to n-th filtered images 25a, 25b, 25c, 25d, and 25e for the second area 12 in correspondence to the number of the filters f1, f2, f3, f4, and f5. In FIG. 4, an example of applying the first to n-th filters f1, f2, f3, f4, and f5 to the first area 11 of the input image 5a to acquire a plurality of filtered images, that is, first to n-th filtered images 25a. 25b. 25c. 25d. and 25e is shown, however, FIG. 4 is a brief drawing for convenience of description. That is, the plurality of different filters f1, f2, f3, f4, and f5 may be applied to each of the second to n-th areas 12, 13, 14, and 15, and accordingly, a plurality of filtered images for each of the second to n-th areas 12, 13, 14, and 15 may be acquired.

According to an exemplary embodiment, the directional filter may be a Gabor filter.

Figure 5:
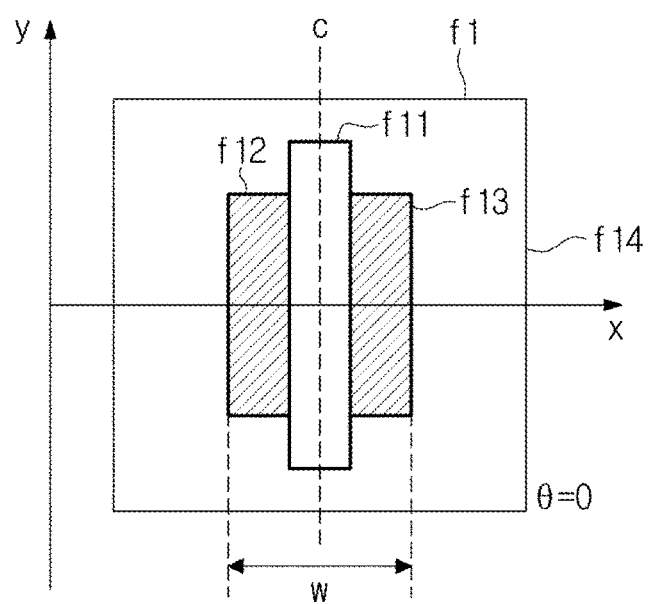
FIG. 5 is a graph for describing a Gabor filter, according to an exemplary embodiment.
Figure 6A:
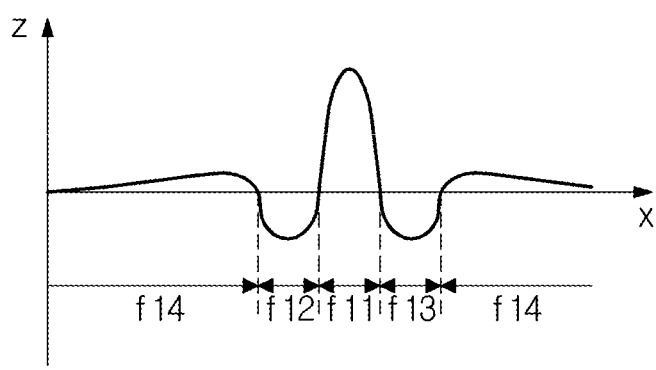
FIGS. 6A and 6B are graphs for describing a Gabor filter.
Figure 6B:
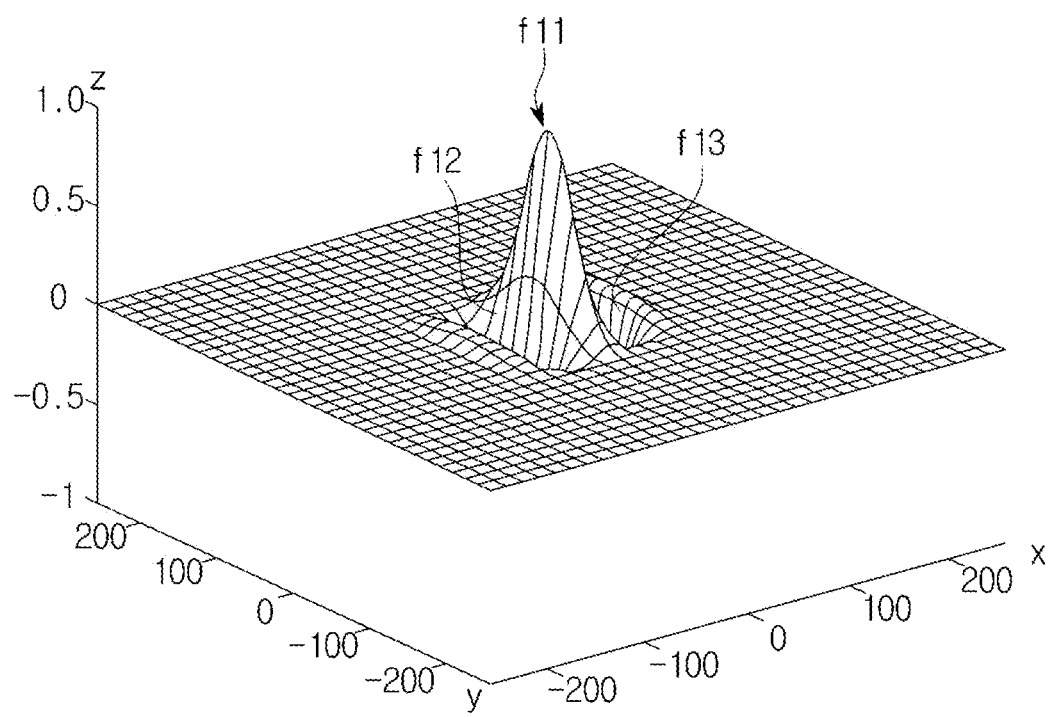

FIGS. 5, 6A, and 6B are graphs for visually describing a Gabor filter.

FIG. 5 is a graph showing a Gabor filter in a z-axis direction, FIG. 6A is a graph showing the Gabor filter in a y-axis direction, and FIG. 6B is a graph three-dimensionally showing the Gabor filter, wherein the x- and y-axes represent the horizontal and vertical directions of the input image 5a, and the z-axis represents a value (for example, a weight value) that is applied to the input image 5a.

The Gabor filter, which is a kind of band-pass filter, can remove noise while protecting protruding areas and recessed areas. The Gabor filter is mainly used to detect edges in pattern recognition, and can adjust the capacity of the filter, a degree of enhancement, and/or a degree of dispersion of the filter freely by changing predetermined parameters.

As shown in FIGS. 5, 6A, and 6B, the Gabor filter may be designed to protrude in the positive direction of z-axis at its center area f11, to be recessed in the negative direction of z-axis at the peripheral areas f12 and f13 of the center area f11, and to have values of zero or nearly zero at the remaining areas f14. As the value of z-axis is greater, the corresponding pixel value of the input image 5a may further increase, and as the value of z-axis is smaller, the corresponding pixel value of the input image 5a may further decrease. Accordingly, if the Gabor filter is applied to the input image 5a, the pixel values of the input image 5a corresponding to the center area f11 may be enhanced, and the pixel values of the input image 5a corresponding to the peripheral areas f12 and f13 may be reduced. For example, if an area having a darker color or higher brightness than the peripheral area, that is, an area having a relatively greater pixel value is located at the center area f11 of the Gabor filter, the area may be relatively further enhanced and displayed, and the peripheral areas of the enhanced area may be relatively weakened and displayed. As a result, an area having a darker color or higher brightness than the peripheral area may be relatively further enhanced in an image. Generally, since edge areas have high brightness and great pixel values, the Gabor filter may be applied to further enhance edge areas as necessary, and to easily detect such edge areas.

The Gabor filter may be expressed as Equation (1), below.

$$g(x, y; \lambda, \theta, \psi, \sigma, \gamma) = \exp\left(\frac{-x'^2 + \gamma^2 y'^2}{2\sigma^2}\right)\cos\left(2\pi\frac{x'}{\lambda} + \psi\right) \quad (1)$$

In Equation (1), x and y are parameters representing locations, g is a value of the Gabor filter, given at the locations of x and y, $\lambda$ is an edge enhancement value for adjusting a degree of edge enhancement, $\psi$ is a location movement value representing a degree of movement of the Gabor filter from the center, $\sigma$ is a distribution value representing a degree of dispersion of the Gabor filter, and $\gamma$ is a ratio value representing the horizontal and vertical proportions of the Gabor filter.

If the edge enhancement value $\lambda$ of Equation (1) is adjusted, the center area f11 of FIGS. 5, 6A, and 6B may further protrude in the positive direction of z-axis, or the peripheral areas f12 and f13 may be further recessed in the negative direction of z-axis. Accordingly, the pixel value of the center area f11 may be further enhanced than those of the peripheral areas f12 and f13 and displayed. In this aspect, by adjusting the edge enhancement value $\lambda$, the strength of edge enhancement can be adjusted.

The location movement value $\psi$ of Equation (1) may represent a degree of movement of the Gabor filter from the center line (c of FIG. 5).

If the distribution value $\sigma$ of Equation (1) increases, the widths of the center area f11 and the peripheral areas f12 and f13 of the Gabor filter may be narrowed, whereas if the distribution value $\sigma$ of Equation (1) decreases, the widths of the center area f11 and the peripheral areas f12 and f13 of the Gabor filter may be widened. In particular, by adjusting the distribution value $\sigma$, a degree of dispersion of the Gabor filter can be adjusted.

The ratio value $\gamma$ of Equation (1) may be decided according to a ratio of the height (vertical length) to the width (horizontal length) of the Gabor filter. A ratio of the height to the width of the Gabor filter can be given as "1" in order to make the width of the Gabor filter identical to the height of the Gabor filter. Generally, the ratio value $\gamma$ is given as 1, however, the ratio value $\gamma$ may be given as another value exceeding zero according to a system designer' setting or a user's selection.

Further, x' and y' of Equation (1) may be expressed according to Equations (2) and (3), below.

$$x' = x \cos\theta + y \sin\theta \quad (2)$$

$$y' = -x \sin\theta + y \cos\theta \quad (3)$$

Herein, θ represents a rotation angle of the filter.

Figure 7:
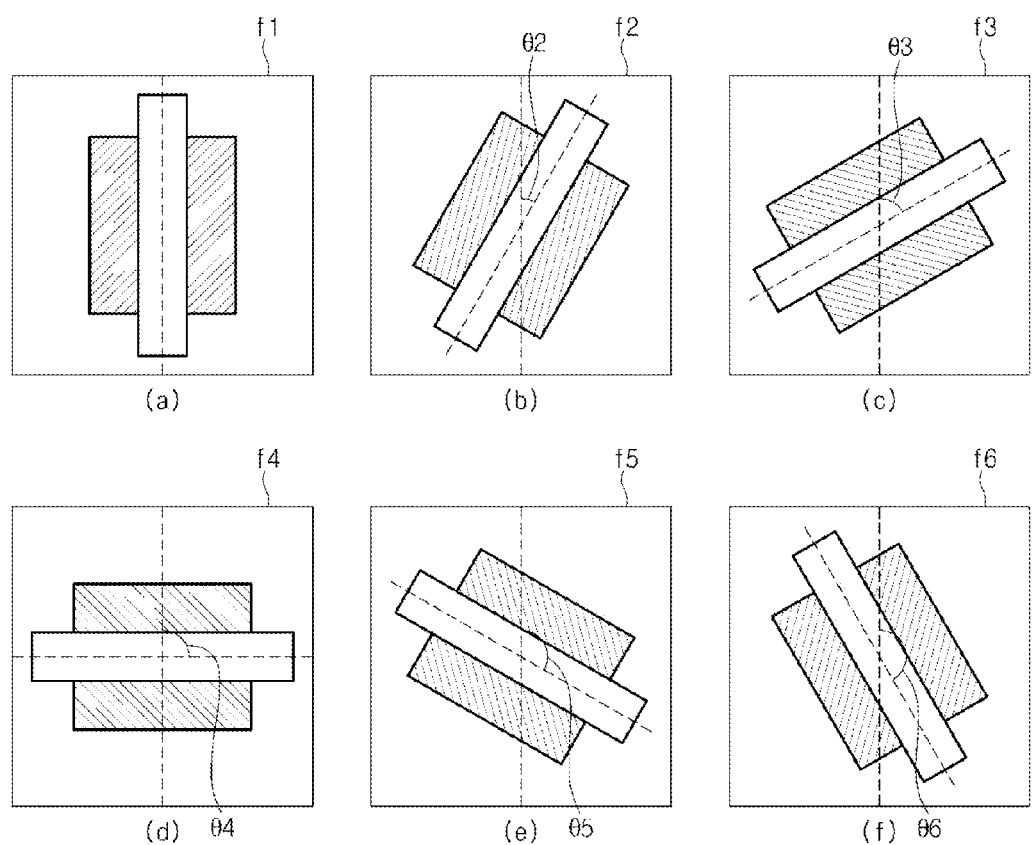
FIG. 7 shows exemplary embodiments of Gabor filters aligned at various angles.

FIG. 7 shows exemplary embodiments of Gabor filters aligned at various angles.

The Gabor filter may rotate in various directions according to the rotation angle θ of Equations (2) and (3).

For example, the Gabor filter may rotate according to the rotation angle θ to be set to be aligned in different directions, as shown in FIG. 7. For example, if the rotation angle θ is set to 0 degree, the Gabor filter (f1) may be aligned in the positive direction of the y-axis while being parallel to the y-axis. If the rotation angle θ is set to 30 degrees, the Gabor filter (f2) may be aligned in a direction rotated by 30 degrees clockwise with respect to the y-axis)(θ2=30°. If the rotation angle θ is set to 60 degrees, the Gabor filter (f3) may be aligned in a direction rotated by 60 degrees clockwise with respect to the y-axis (θ3=60°). If the rotation angle θ is set to 90 degrees, the Gabor filter (f4) may be aligned in the positive direction of the x-axis while being parallel to the z-axis (θ4=90°). If the rotation angle θ is set to 120 degrees, the Gabor filter (f5) may be aligned in a direction rotated by 30 degrees clockwise with respect to the x-axis (θ5=120°). If the rotation angle θ is set to 150 degrees, the Gabor filter (f6) may be aligned in a direction rotated by 60 degrees clockwise with respect to the x-axis (θ6=150°).

In FIG. 7 which shows exemplary embodiments of Gabor filters aligned at various angles θ, six Gabor filters f1, f2, f3, f4, f5, and f6 aligned at six rotation angles θ (that is, 0 degree, 30 degrees, 60 degrees, 90 degrees, 120 degrees, and 150 degrees) set in unit of 30 degrees are shown, however, the rotation angle θ of the Gabor filter is not limited to these. In particular, the Gabor filter may be set to have another rotation angle θ according to a system designer's setting or a user's manipulation. For example, the rotation angle θ of the Gabor filter may be set in unit of 10 degrees, and in this case, totally 18 Gabor filters can be set. However, the Gabor filter may be set to have another rotation angle θ.

A plurality of different Gabor filters may be set according to values of the parameters λ, ψ, σ, γ, and θ. The plurality of different Gabor filters may be used to filter the input image 5a or the plurality of areas 11, 12, 13, 14, and 15 through the filter applying unit 20.

The filter applying unit 20 may apply a plurality of directional filters set to be aligned in different directions to the input area 5a or the individual areas 11 to 15 of the input image 5a. For example, as shown in FIG. 7, the filter applying unit 20 may apply the plurality of Gabor filters f1 to f6 aligned in various directions, to the entirety of the input image 5a or to the individual areas 11 to 15 of the input image 5a. By applying the Gabor filters f1 to f6 aligned in various directions to the entirety of the input image 5a or to the individual areas 11 to 15 of the input image 5a, edges extending in various directions in the entirety of the input image 5a or in the individual areas 11 to 15 of the input image 5a may be enhanced. For example, the first filter f1 of FIG. 7 may enhance edges extending in a direction that is parallel to the y-axis, and the second filter f2 may enhance edges extending in a direction that makes an angle of 30 degrees with respect to the y-axis. Accordingly, a filtered image 25 (see FIG. 4) with enhanced edges extending in various directions can be acquired.

If a plurality of first to n-th filters f1 to f5 aligned in different directions are applied to the individual areas 11 to 15 of the input image 5a to acquire a plurality of filtered images 25a to 25e for the individual areas 11 to 15, the plurality of filtered images 25a to 25e may be acquired with enhanced edges extending in various directions.

As such, by enhancing edges of the individual areas 11 to 15 of the input image 5a, a filtered image 25 with enhanced edges for the entire of the input image 5a may be acquired.

According to an exemplary embodiment, the correction value decider 3 may further include at least one of a filter storage unit 21 to store at least one filter f, and a filter setting unit 22 to change a setting value of the at least one filter f.

The filter applying unit 20 may call a filter f stored in the filter storage unit 21, and apply the called filter f to the input image 5a or the individual areas 11 to 15 of the input image 5a in order to acquire a filtered image 25, or the filter applying unit 20 may apply a filter f decided according to a setting value of the filter setting unit 22 to the input image 5a or the individual areas 11 to 15 of the input image 5a to filter the input image 5a or the individual areas 11 to 15 of the input image 5a, thereby acquiring a filtered image 25.

According to an exemplary embodiment, the filter storage unit 21 may store one or more directional filters f temporarily or non-temporarily. The filter storage unit 21 may store a plurality of the same directional filters which are aligned in different directions. For example, the filter storage unit 21 may store a plurality of various Gabor filters f1 to f6 as described above. The plurality of various Gabor filters f1 to f6 stored in the filter storage unit 21 may include Gabor filters with different rotation angles G. The filter storage unit 21 may be implemented as one or more solid state storage devices, a disk storage device, an optical disk storage device, or a magnetic tape storage device.

The filter storage unit 21 may transfer the stored filter f to the filter applying unit 20 according to the control of the filter applying unit 20 or an external controller 23. The external controller 23 may be implemented as a processor that is separated from the correction value decider 3. The external controller 23 may include a Central Processing Unit (CPU) or a Graphic Processing Unit (GPU). According to an exemplary embodiment, the filter f stored in the filter storage unit 21 may be a filter f set by the filter setting unit 22.

The filter setting unit 22 may adjust various parameters related to a filter to set a filter f. For example, the filter setting unit 22 may adjust various parameters λ, ψ, σ, γ, and θ to decide various kinds of filters f, and transfer the decided filters f to the filter applying unit 20. The filter applying unit 20 may use the filters f decided by the filter setting unit 22 to filter the input image 5a or the individual areas 11 to 15 of the input image 5a. Further, the filter setting unit 22 may transfer the decided filters f to the filter storage unit 21, and the filter storage unit 21 may store the received filters f.

The filter setting unit 22 may set a filter f according to an electrical signal received from an external manipulation unit 24 or the external controller 23. Accordingly, a user may manipulate the external manipulation unit 24 to adjust a filter f that is to be applied to the input image 5a or the individual areas 11 to 15 of the input image 5a. The external manipulation unit 24 may be at least one of various kinds of manipulation units including a physical button, a mouse, a scroll device, a manipulation stick, a track-ball, a touch pad, and a touch screen, which can be considered by one of ordinary skill in the art in order to input a predetermined command.

The filter setting unit 22 may be implemented as a processor configured with one or more semiconductor chips and the related components.

Any of the filter storage unit 21, the filter setting unit 22, the external manipulation unit 24, or the external controller 23 may be omitted as necessary.

The edge detector 30 may detect an edge from the filtered image 25. As described above, since the filtered image 25 has an enhanced edge, the edge detector 30 may use the filtered image 25 to detect an edge of the input image 5a. The edge detector 30 may detect an edge for the entire of the input image 5a or for the individual areas 11 to 15 of the input image 5a. According to an exemplary embodiment, the edge detector 30 may select an image with an enhanced edge extending in a direction from the filtered images 25a to 25e, and detect an edge from the selected image. For example, an edge extending parallel to the y-axis of an image may be most enhanced in a filtered image acquired by applying the first filter f1 of FIG. 7 to the image. Accordingly, the edge detector 30 may detect the edge extending parallel to the y-axis from the filtered image acquired by applying the first filter f1 of FIG. 7.

Figure 8:
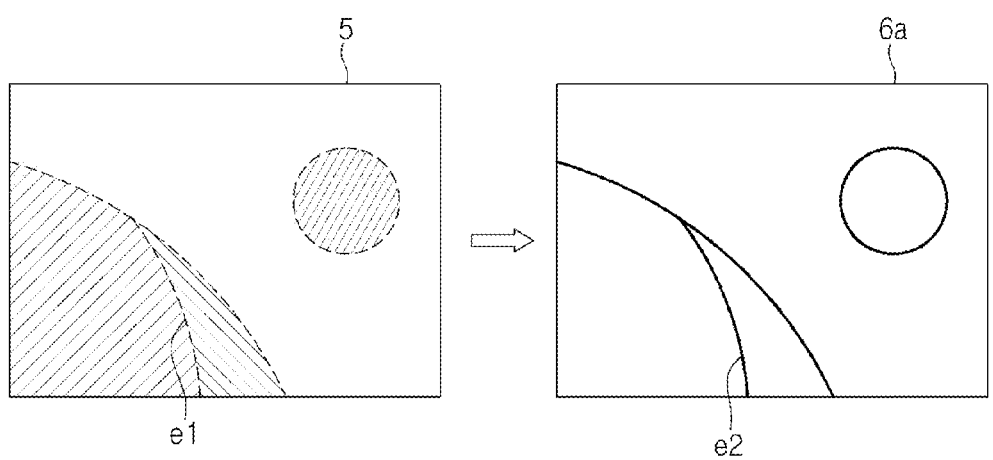
FIG. 8 shows an input image and an edge-detected image.

FIG. 8 shows an input image and an edge-detected image.

As shown in FIG. 8, although an edge e1 is relatively weakened and displayed in an input image 5, the edge detector 30 may use a filtered image 25 filtered by the filter applying unit 20 in order to detect an edge e2. Accordingly, the edge detector 30 may acquire an edge-detected image 6a. The edge-detected image 6a may include only the edge e2 or may include the edge e2 as a main component. The acquired edge e2 may be formed by pixel values.

As shown in FIG. 3, the edge-detected image 6a acquired by the edge detector 30 may be transferred to the noise removing unit 31 and the mean value calculator 32.

Figure 9:
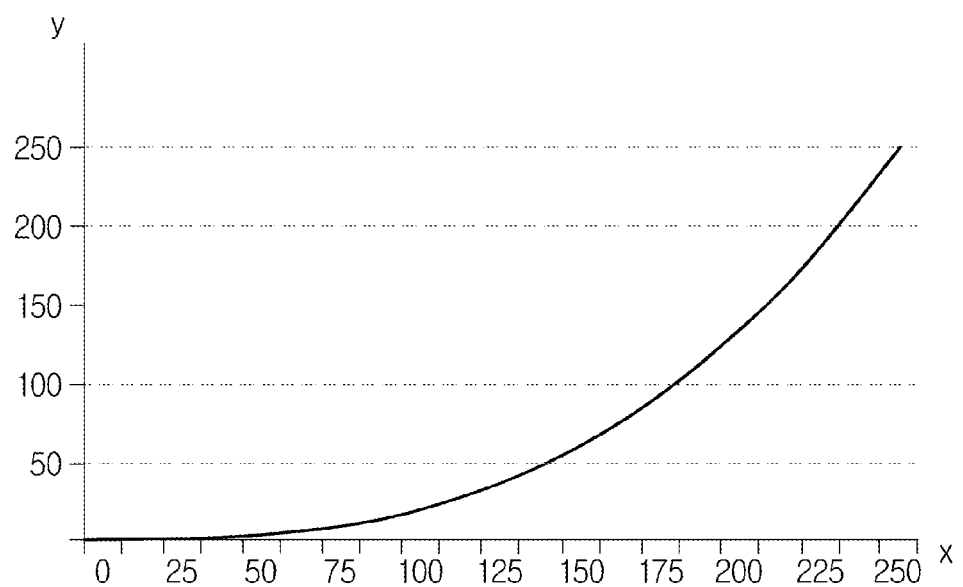
FIG. 9 is a graph showing a curve that is applied for noise removal.

FIG. 9 is a graph showing a curve that is applied for noise removal. In FIG. 9, values of the x-axis mean pixel values before the curve is applied, and values of the y-axis mean pixel values after the curve is applied.

The noise removing unit 31 may remove noise from the edge-detected image 6a. In particular, the noise removing unit 31 may apply the curve shown in FIG. 9 to the edge-detected image 6a to remove noise from the edge-detected image 6a.

As shown in FIG. 9, the curve may have a waveform of an exponential function. Accordingly, as an x-axis value which is a pixel value before the curve is applied is smaller, the corresponding y-axis value which is a pixel value after the curve is applied may also decrease, whereas as an x-axis value which is a pixel value before the curve is applied is greater, the corresponding y-axis value which is a pixel value after the curve is applied may increase exponentially, As a result, if the curve shown in FIG. 9 is applied, an edge with small pixel values may be suppressed, whereas an edge with great pixel values may be enhanced.

Accordingly, the noise removing unit 31 may suppress image noise such as speckle noise that may be generated in ultrasound images or the like. As a result, the noise removing unit 31 may acquire an image 6b from which an edge has been detected and then noise has been removed. In the following description, the image 6b from which an edge has been detected and then noise has been removed will be referred to as a noise-removed image.

The noise removing unit 31 may be omitted as necessary.

The image 6b acquired by the noise removing unit 31 may be transferred to the mean value calculator 32.

The mean value calculator 32 may calculate a mean value of pixel values by using the pixel values of the received edge-detected image 6a or the received nose-removed image 6b. Herein, the mean value of the pixel values may be the average brightness of a plurality of pixel values of a plurality of pixels. The mean value calculator 32 may calculate an average brightness value of high-frequency components added to the input image 5a during edge enhancement.

Figure 10:
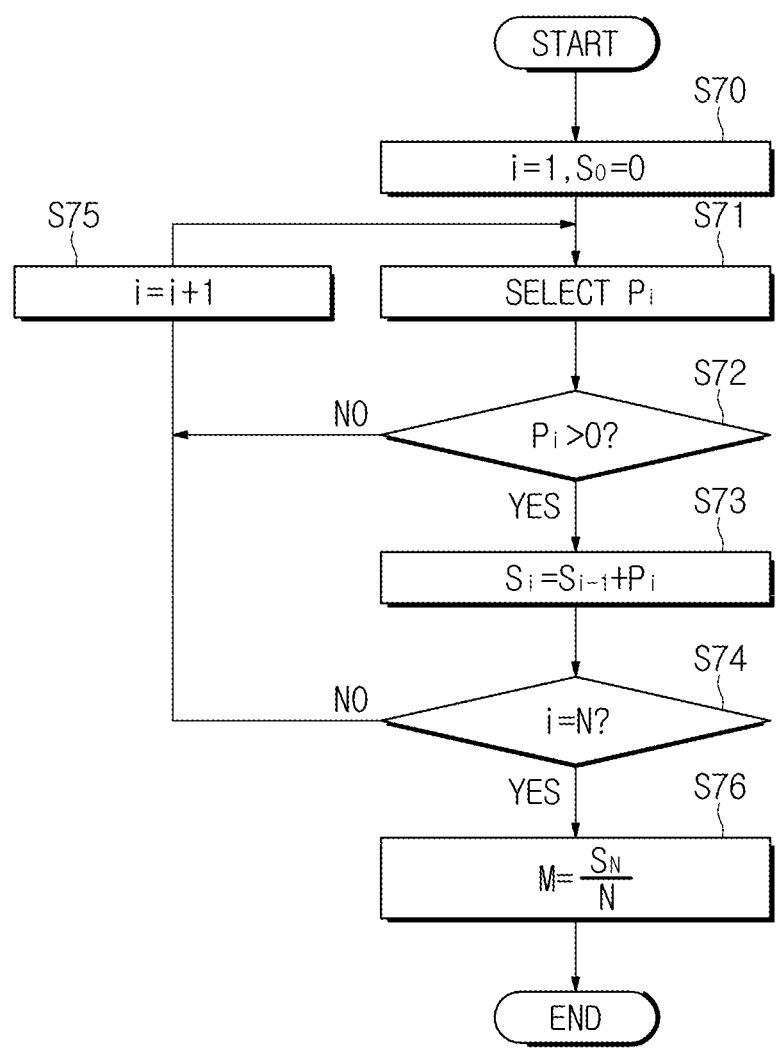
FIG. 10 is a flowchart illustrating an exemplary embodiment of an algorithm for acquiring a mean value of pixel values of an edge.

FIG. 10 is a flowchart illustrating an exemplary embodiment of an algorithm for acquiring a mean value of pixel values of an edge.

According to an exemplary embodiment, the mean value calculator 32 may calculate a mean value by using the algorithm shown in FIG. 10. In the algorithm of FIG. 10, i represents an index of each pixel, $P_i$ represents a pixel value of each pixel, for example, a brightness value of each pixel, and $S_i$ represents a sum of a plurality of pixel values of a plurality of pixels up to a pixel of an i-th index, wherein $S_0$ may be defined as zero, and N is the total number of pixels.

Referring to FIG. 10, the mean value calculator 32 may select a first pixel $P_1$, in operations S70 and S71. The first pixel $P_1$ may be a pixel arbitrarily selected by the mean value calculator 32 from among a plurality of pixels of the edge-detected image 6a or the noise-removed image 6b. According to an exemplary embodiment, the first pixel $P_1$ may be decided by a system designer or a user.

Then, the mean value calculator 32 may determine whether a value of the first pixel $P_1$ is greater than zero, in operation S72. If the value of the first pixel $P_1$ is greater than zero, then in operation S73, the value of the first pixel $P_1$ is assigned to $S_1$ which is a sum of a pixel value of a pixel of the pixel of the first index $P_1$. If the value of the first pixel $P_1$ is smaller than or equal to zero, the value of the first pixel $P_1$, may be ignored and a second pixel $P_2$ that is next to the first pixel $P_1$ is selected, in operations S75 and S71.

Successively, in operation S74, the mean value calculator 32 may determine whether the index i of the corresponding pixel $P_i$ is identical to the total number N of pixels. In particular, the mean value calculator 32 may determine whether pixel values of all pixels have been summed. If the mean value calculator 32 determines that the index i of the pixel $P_i$ is not identical to the total number N of pixels, the mean value calculator 32 may perform the above-described operations S71 to S74 on a pixel of the next index, for example, the second pixel $P_2$.

In this way, the mean value calculator 32 may acquire a sum $S_N$ of pixel values of all pixels.

After the mean value calculator 32 acquires the sum $S_N$ of the pixel values of all pixels, the mean value calculator 32 may divide the sum $S_N$ of the pixel values of all pixels by the total number N of pixels to acquire a mean value M of the pixel values, in operation S76. In this manner, the mean value calculator 32 may acquire a mean value M of the pixel values of all pixels. The mean value calculator 32 may transfer the mean value M to the correction value calculator 33.

The correction value calculator 33 may use the mean value M to determine a correction value (6 of FIG. 1) that is to be applied to the input image 5a. The correction value calculator 33 may calculate one or more correction values 6 that are to be applied to all the pixels of the input image 5a, or may calculate one or more correction values 6 that are to be applied to some of all the pixels.

According to an exemplary embodiment, the correction value calculator 33 may determine a plurality of correction values 6 that are to be respectively applied to the individual pixels of the input image 5a. The correction values 6 that are to be respectively applied to the individual pixels of the input image 5a may be the same value or different values.

Also, correction values 6 that are to be respectively applied to a part of the plurality of pixels may be the same value, and correction values 6 that are to be respectively applied to the other part of the plurality of pixels may be different values.

According to another exemplary embodiment, the correction value calculator 33 may determine a plurality of correction values 6 that are to be respectively applied to the individual areas 11 to 15 of the input image 5*a*. In this case, the same correction value 6 may be applied to the pixels of each area 11 to 15. The correction values 6 that are to be respectively applied to the individual areas 11 to 15 of the input image 5*a* may be different values or the same value. Also, correction values 6 that are to be respectively applied to a part of the areas 11 to 15 may be the same value, and correction values 6 that are to be respectively applied to the other part of the areas 11 to 15 may be different values.

According to still another exemplary embodiment, the correction value calculator 33 may determine a correction value 6 that can be applied to the entire of the input image 5*a*, and in this case, the correction value 6 may be applied to all the pixels of the input image 5*a*.

The correction value calculator 33 may determine the correction value 6 based on a mean value of the pixel values of the edge e2 and the magnitudes of the pixel values.

In particular, as a mean value of the pixel values of the edge e2 is greater, the correction value calculator 33 may decide a smaller correction value 6, and as a mean value of the pixel values of the edge e2 is smaller, the correction value calculator 33 may decide a greater correction value 6. In this aspect, the correction value calculator 33 may decide a correction value 6 that is inversely proportional to the mean value of the pixel values of the edge e2. As such, by determining a correction value 6 that is inversely proportional to the mean value of the pixel values of the edge e2, the brightness of the entire or a part of the corresponding image may not increase when the correction value 6 is applied to the image.

Also, as a pixel value of a pixel or an area to which a correction value 6 is to be applied is greater, the correction value calculator 33 may determine a greater correction value 6, and as a pixel value of a pixel or an area to which a correction value 6 is to be applied is smaller, the correction value calculator 33 may determine a smaller correction value 6. In this aspect, the correction value calculator 33 may determine a correction value 6 that is proportional to a pixel value of a pixel or an area to which the correction value 6 is to be applied. Since the edge e1 of the input image 5*a* has a relatively greater pixel value than the remaining area of the input image 5*a*, if a correction value 6 is determined to be proportional to a pixel value of a pixel or an area to which the correction value 6 is to be applied, the edge e1 can be further enhanced than the remaining area.

As such, by determining a smaller correction value as the mean value of pixel values is greater while determining a greater correction value as a pixel value is greater, an image with a further enhanced edge (e4 of FIG. 11) may be acquired without increasing the average brightness of the corrected image, that is, the output image 7.

According to an exemplary embodiment, the correction value calculator 33 may calculate the correction value 6 according to Equation (4), below.

$$w=(255-A^{\alpha})+fD^{\alpha} \quad (1)$$

In Equation (4), w represents a correction value, A represents a mean value of pixel values calculated by the mean value calculator 32, and fD represents a pixel value of a filtered image 25 acquired by applying a filter f through the filter applying unit 20. According to an exemplary embodiment, fD may represent a pixel value of each pixel of the filtered image 25. α represents a parameter for adjusting the curve slope of an exponential function. α may be arbitrarily decided according to a system designer's setting or user's selection. For example, a may be 1.

The correction value 6 acquired by the correction value calculator 33 may be transferred to the image corrector 4.

Figure 11:
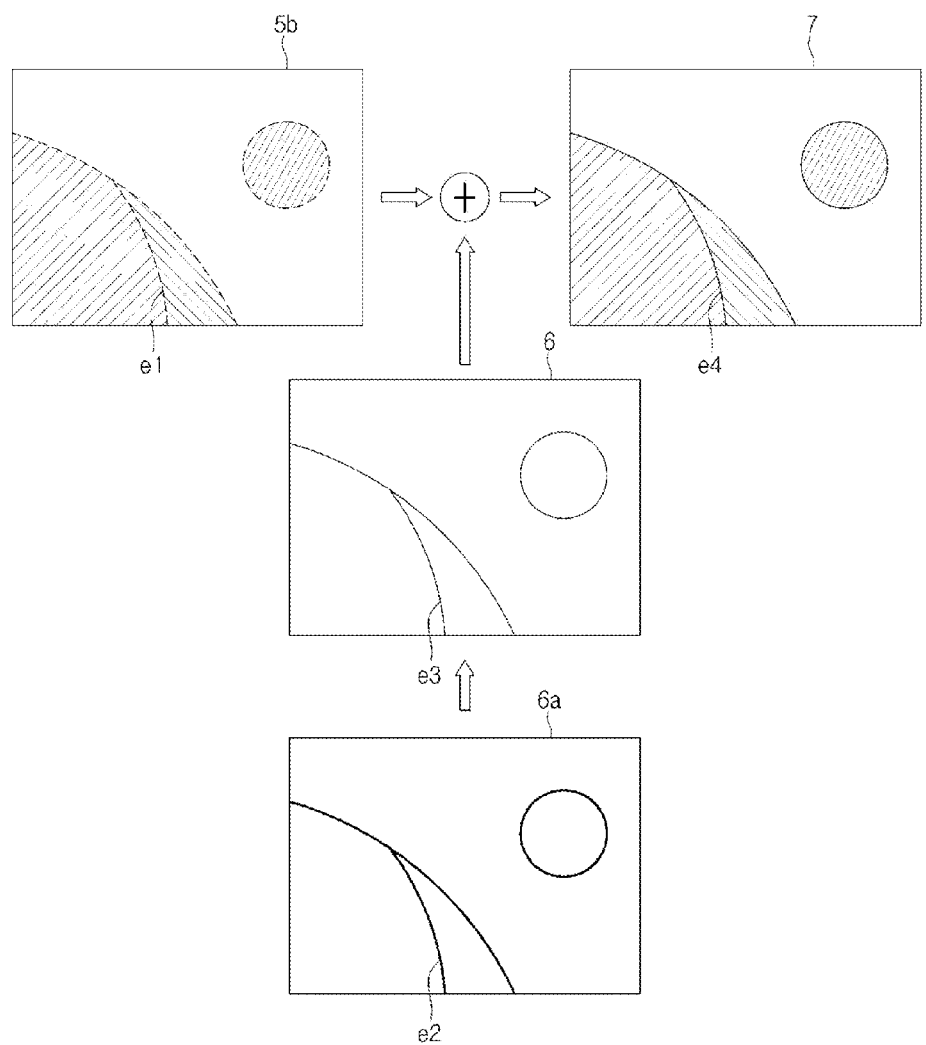
FIG. 11 is a view for describing an image corrector.

FIG. 11 is a view for describing the image corrector 4. In FIG. 11, for convenience of description, a correction value 6 is shown as if it is a visual image. However, on the real system, the correction value 6 may be given as a numerical value.

As shown in FIGS. 1, 3, 4, and 11, the image corrector 4 may apply the correction value 6 to the input image 5*a* in order to thus acquire the output image 7. In particular, the image corrector 4 may correct the input image 5*a* received from the input unit 2 by using a correction value 6 in order to thus acquire the output image 7. The correction value 6 may be acquired by using the edge-detected image 6*a* as described above.

The image corrector 4 may apply a correction value 6 that corresponds to each pixel of the input image 5*a* to the pixel in order to thereby acquire the output image 7. In this case, the image corrector 4 may apply the correction value 6 to the input image 5*a* in such a way to multiply a correction value 6 that corresponds to each pixel of the input image 5*a* by the pixel value of the pixel.

For example, as shown in FIG. 11, the image corrector 4 may reflect a correction value 6 acquired from the edge-detected image 6*a* from which the edge e2 has been detected or the noise-removed image 6*b* from which the edge e2 has been detected and then noise has been removed, to the input image 5*a*, thereby acquiring an output image 7 with a further enhanced edge e4 than the edge e1 of the input image 5*a*.

In this case, the image corrector 4 may apply the correction value 6 to the corresponding pixel or area of the input image 5*a* to thereby acquire the output image 7. The correction value 6 for each pixel acquired by the correction value calculator 33 may be determined as a smaller value as a mean value of the pixel values of the corresponding edge is greater, and as a greater value as the pixel value of the pixel is greater.

According to an exemplary embodiment, the image corrector 4 may acquire the output image 7 according to Equation (5), below.

$$O=w*I \quad (5)$$

In Equation (5), O represents a pixel of the output image 7, w represents the correction value 6, and I represents the pixel value of the input image 5*a*. In Equation (5), O, w, and I may be given as a predetermined matrix.

In some cases, the pixel value O of the output image 7 may exceed 255 or be smaller than zero. However, if the pixel value O of the output image 7 exceeds 255 or is smaller than zero, an error may be generated. In this case, according to an exemplary embodiment, a saturation method or a warp method may be used to perform clamping processing to thereby prevent such an error.

For example, if the saturation method is used, the image corrector 4 may determine the pixel value O of the output image 7 as 255 if the pixel value O of the output image 7 exceeds 255, and decide the pixel value O of the output image to zero if the pixel value O of the output image 7 is smaller than zero.

As another example, if the wrap method is used, the image corrector 4 may subtract 255 from the pixel value O of the output image if the pixel value O of the output image 7 exceeds 255, and add 255 to the pixel value O of the output image if the pixel value O of the output image 7 is smaller than zero.

The image corrector 4 may be implemented by using one or more processors, and the one or more processors may include a CPU or a GPU.

Figure 12:
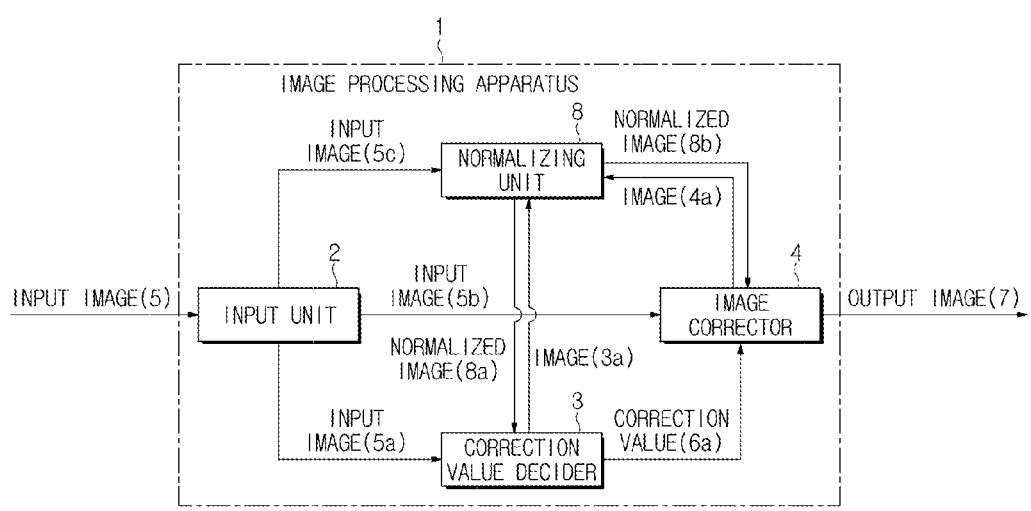
FIG. 12 is a block diagram of an image processing apparatus, according to another exemplary embodiment.

FIG. 12 is a block diagram of the image processing apparatus 1, according to another exemplary embodiment.

Referring to FIG. 12, the image processing apparatus 1 may include a normalizing unit (also referred to herein as a "normalizer") 8, in addition to the input unit 2, the correction value decider 3, and the image corrector 4. The input unit 2, the correction value decider 3, and the image corrector 4 may be the same as or easily induced from the corresponding components described above with reference to FIG. 1, and accordingly, detailed descriptions therefor will be omitted.

The normalizing unit 8 may normalize pixel values of an input image 5c.

If a pixel value includes a brightness value given as a value between zero and 255 as described above, the normalizing unit 8 may convert the value between zero and 255 into a value between zero and one to thereby normalize the pixel value.

For example, if a pixel value of a pixel of the input image 5c is a value of zero, the normalizing unit 8 may decide the corresponding normalized pixel value as zero, and if a pixel value of another pixel of the input image 5c is a value of 255, the normalizing unit 8 may decide the corresponding normalized pixel value as one. In this way, the normalizing unit 8 may decide each pixel value of the input image 5c having a value between zero and 255, as a predetermined value between 0 and 1, according to a relative location of the pixel value, to thereby normalize the pixel values of the input image 5c.

According to an exemplary embodiment, the normalizing unit 8 may normalize the input image 5c received from the input unit 2, and according to another exemplary embodiment, the normalizing unit 8 may normalize predetermined images 3a and 4a received from the correction value decider 3 and the image corrector 4, and transfer the normalized images 8a and 8b to the correction value decider 3 and the image corrector 4, respectively. Accordingly, the normalizing unit 8 may perform image normalization at various times.

For example, the normalizing unit 8 may perform image normalization before the correction value decider 3 and the image corrector 4 operate or when the correction value decider 3 and the image corrector 4 decide correction values or correct an image. A time at which image normalization is performed may be arbitrarily decided by a system designer.

The normalizing unit 8 may transfer the normalized images 8a and 8b to the correction value decider 3 and the image corrector 4, respectively.

The correction value decider 3 may use the normalized image 8a to determine a correction value 6a, without using the input images 5a and 5b.

In particular, the correction value decider 3 may use the normalized image 8a to calculate the correction value 6a according to Equation (6), below, instead of Equation (4).

$$w = (1 - A^\alpha) + fD^\alpha \qquad (6)$$

In Equation (6), w represents a correction value that can be applied as a weight value to the input image 5a, A represents a mean value of pixel values calculated by the mean value calculator 32, and fD represents a pixel value of a filtered image 25 acquired by applying a filter f through the filter applying unit 20. According to an exemplary embodiment, fD may represent a pixel value of each pixel of the filtered image 25, and α represents a parameter for adjusting the curve slope of an exponential function. According to an exemplary embodiment, α may be given as 1. However, α may be given as another arbitrary value.

The image corrector 4 may correct the normalized image 8b by using the correction value 6a determined by using the normalized image 8a in order to acquire an output image 7.

In particular, the image corrector 4 may use the normalized image 8b to acquire the output image 7 according to Equation (5). When the normalized image 8b is used, the pixel value O of the output image 7 may exceed one or be smaller than zero. In this case, according to the saturation method, the image corrector 4 may determine the pixel value O of the output image 7 to be equal to one if the pixel value O of the output image 7 exceeds one, and may determine the pixel value O of the output image to be equal to zero if the pixel value O of the output image is smaller than zero. According to the wrap method, the image corrector 4 may subtract 255 from the pixel value O of the output image 7 or add 255 to the pixel value O of the output image 7 to determine the pixel value O.

Figure 13:
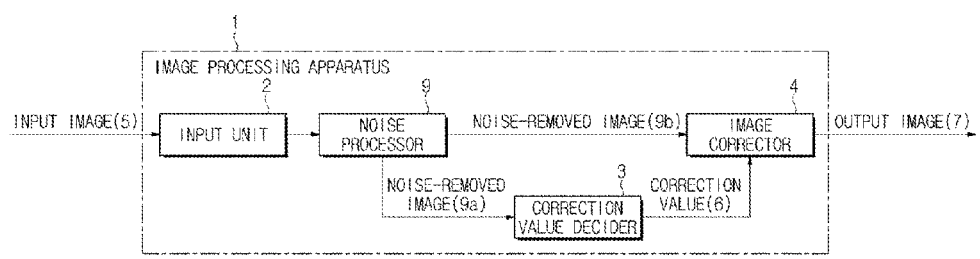
FIG. 13 is a block diagram of an image processing apparatus, according to still another exemplary embodiment.

FIG. 13 is a block diagram of the image processing apparatus 1, according to still another exemplary embodiment.

Referring to FIG. 13, the image processing apparatus 1 may further include a noise processor 9, in addition to the input unit 2, the correction value decider 3, and the image corrector 4. The noise processor 9 may receive an input image 5 from the input unit 2, remove noise from the input image 5, and then transfer images 9a and 9b from which noise has been removed from the input image 5 to the correction value decider 3 and the image corrector 4, respectively. The images 9a and 9b that are respectively transferred to the correction value decider 3 and the image corrector 4 may be the same images. The noise removing unit 31 shown in FIG. 3 may remove noise from the edge-detected image 6a, whereas the noise processor 9 shown in FIG. 13 may remove noise from the input image 5.

According to an exemplary embodiment, the noise processor 9 may remove noise by using a speckle noise removing filter. The speckle noise removing filter may be used to remove image noise such as speckle noise as described above. The speckle noise removing filter used in the noise processor 9 may be one of various kinds of filters that can be considered by one of ordinary skill in the art. The speckle noise removing filter is well known in the art, and accordingly, a detailed description thereof will be omitted.

The correction value decider 3 may determine a correction value 6 by using the image 9a from which noise has been removed by the noise processor 9, and the image corrector 4 may correct the image 9b to thereby acquire an output image 7.

The input unit 2, the correction value decider 3, and the image corrector 4 are the substantially same as or partially modified from the corresponding components described above with reference to FIGS. 1 to 12, and accordingly, further descriptions therefor will be omitted.

Hereinafter, an image capturing apparatus, and various exemplary embodiments of such an image capturing apparatus will be described with reference to FIGS. 14, 15, 16, and 17.

Figure 14:
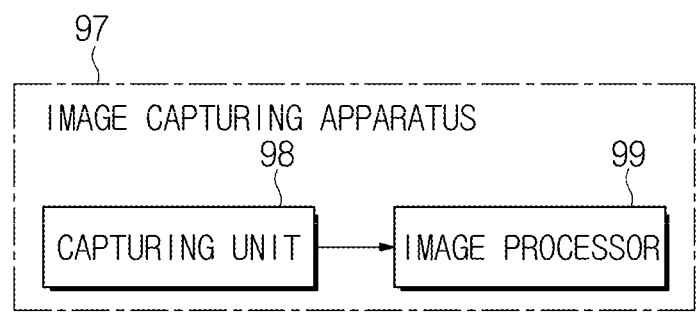
FIG. 14 is a block diagram of an image capturing apparatus, according to an exemplary embodiment.

FIG. 14 is a block diagram of an image capturing apparatus, according to an exemplary embodiment.

Referring to FIG. 14, an image capturing apparatus 97 may include a capturing unit (also referred to herein as a "capturer") 98 and an image processor 99.

The capturing unit 98 may use various means to collect an unprocessed image which is information about the inside or outside of a subject. For example, the capturing unit 98 may acquire information about the inside or outside of a subject by using at least one of visible light, infrared light, radiation, ultrasonic waves, microwaves, laser, and FID signals induced according to a MR phenomenon. The acquired information may be processed by the image processor 99 to be converted into an image that a user can see visually. The capturing unit 98 may be implemented as a hardware component that is configured to perform the above-described functions, and may include, for example, a microprocessor.

The image processor 99 may create an image based on the information collected by the capturing unit 98, and perform image processing on the created image. The created image may be used as the input image 5 of the image processing apparatus 1.

More specifically, the image processor 99 may apply a directional filter which is alignable in an arbitrary direction with respect to the created image, in order to detect an edge of the created image, acquire pixel values of pixels corresponding to the detected edge, and calculate a mean value of the acquired pixel values.

Successively, the image processor 99 may determine a correction value according to the mean value of the pixel values, and then apply the correction value to the created image in order to correct the created image. Herein, the correction value may be a respective value that corresponds to each pixel or area of the created image. According to an exemplary embodiment, the image processor 99 may determine a correction value by using a mean value of a plurality of pixel values of a plurality of pixels corresponding to an edge, and a pixel value of each pixel or area of the input image.

According to an exemplary embodiment, the capturing unit 98 and the image processor 99 may be physically coupled with each other, and installed in a housing. In this case, the capturing unit 98 and the image processor 99 may be electrically connected to each other by a circuit of a Printed Circuit Board (PCB) or various cables installed in the same housing, in order to receive/transmit predetermined data from/to each other.

According to another exemplary embodiment, the capturing unit 98 and the image processor 99 may be physically separated from each other, and respectively installed in a plurality of different housings. In this case, the capturing unit 98 and the image processor 99 may be electrically connected to each other through various communication cables or through a wireless communication network, in order to receive/transmit predetermined data from/to each other. Herein, the wireless communication network may be a short-range wireless communication network, such as Bluetooth, Bluetooth Low Energy (BLE), Infrared Data Association (IrDA), Wireless Fidelity (Wi-Fi), Wi-Fi Direct, Ultra Wideband (UWB), or Near Field Communication (NFC), or may be a wireless communication network that supports IEEE802.11x standards of the Institute of Electrical and Electronics Engineers (IEEE) established using a wireless communication system such as Long-Term Evolution (LTE).

In the case in which the capturing unit 98 is separated from the image processor 99, the image processor 99 may be implemented as at least one server located at a remote site.

Hereinafter, various exemplary embodiments of the image capturing apparatus 97 will be described.

Figure 15:
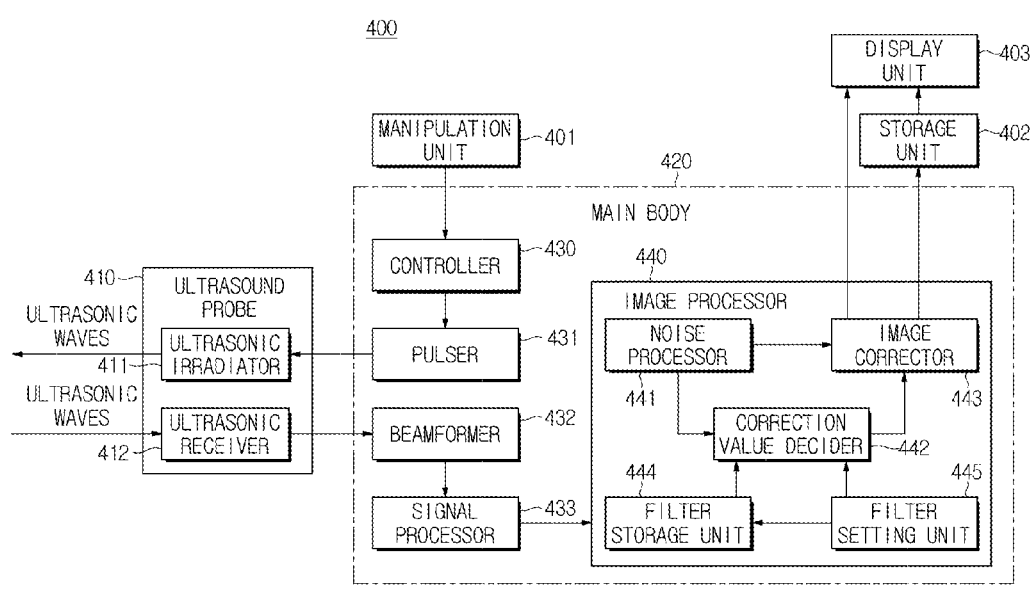
FIG. 15 is a block diagram of an ultrasonic imaging apparatus, according to an exemplary embodiment.

FIG. 15 is a block diagram of an ultrasonic imaging apparatus, according to an exemplary embodiment.

Referring to FIG. 15, an ultrasonic imaging apparatus 400 may include an ultrasound probe 410 and a main body 420.

The ultrasound probe 410 may receive ultrasonic waves emitted from a target area inside a subject. In order to receive ultrasonic waves emitted from a target area inside a subject, the ultrasound probe 410 may include an ultrasonic receiver 412. Also, the ultrasound probe 410 may further include an ultrasonic irradiator 411 configured to generate ultrasonic waves, and to irradiate the ultrasonic waves to the target area of the subject. The ultrasonic receiver 412 may receive ultrasonic waves irradiated from the ultrasonic irradiator 411 and then reflected from the target area. According to an exemplary embodiment, the ultrasound probe 410 may include an ultrasonic transceiver (not shown) that can transmit and receive ultrasonic waves. The ultrasonic irradiator 411 or the ultrasonic transceiver may receive a voltage from a pulser 431, generate ultrasonic waves of a frequency corresponding to the frequency of the received voltage, and irradiate the ultrasonic waves to the inside of the subject.

The ultrasonic irradiator 411 and the ultrasonic receiver 412 may be implemented as an ultrasonic device. The ultrasonic device may be an ultrasonic transducer. The ultrasonic device may vibrate according to an electrical signal to generate ultrasonic waves of a predetermined frequency, or may vibrate at a predetermined frequency according to ultrasonic waves of the predetermined frequency to convert the ultrasonic waves into an electrical signal.

The ultrasonic transducer may be a piezoelectric ultrasonic transducer using the piezoelectric effect of a piezoelectric material, a magnetostrictive ultrasonic transducer using the magnetostrictive effect of a magnetic material, or a capacitive micromachined ultrasonic transducer (cMUT) using vibration of several hundreds or thousands of micromachined thin films.

The ultrasound probe 410 may be an ultrasound probe that can perform a linear scan, or an ultrasound probe that can perform a sector scan, according to a pulse transfer method.

An ultrasonic signal received by the ultrasonic receiver 412 may be transferred to a beamformer 434.

The main body 420 may include a controller 430 which is configured to control the ultrasonic imaging apparatus 400, the pulser 431 which is configured to apply an electrical signal of a predetermined frequency to the ultrasonic irradiator 411 of the ultrasound probe 410, the beamformer 432 which is configured to perform beamforming on an ultrasonic signal received by the ultrasonic receiver 412, and a signal processor 433 which is configured to perform various signal processing functions on the beamformed signal. The controller 430, the pulser 431, the beamformer 432, and the signal processor 433 may be installed in the housing of the ultrasound probe 410 or in the main body 420. The controller 430, the pulser 431, the beamformer 432, and the signal processor 433 may be implemented with semiconductor chips and the related components.

The manipulation unit (also referred to herein as a "user input device") 401 may generate an electrical signal according to a user's manipulation, and transfer the electrical signal to the controller 430 so that the ultrasonic imaging apparatus 400 can be controlled according to the user's intention. The manipulation unit 401 may include at least one of various kinds of manipulation units, including one or more buttons, a mouse, a scroll device, a manipulation stick, a track-ball, a touch pad, and a touch screen, which can be considered by one of ordinary skill in the art in order to enable a user to input a predetermined command.

The storage unit 402 may receive an output image, and store the received output image temporarily or non-temporarily. The storage unit 402 may be implemented as one or more solid state storage devices, a disk storage device, an optical disk storage device, or a magnetic tape storage device.

The display unit 403 may display an output image received from an image corrector 443 or an output image stored in the storage unit 402 for a user. The display unit 403 may be implemented using one of various display devices, such as a Plasma Display Panel (PDP) display, a Light Emitting Diode (LED) display, a Liquid Crystal Display (LCD), or a Cathode-Ray Tube (CRT) display. Also, the display unit 503 may be implemented as a touch screen capable of receiving touch inputs.

The controller 430 may control overall operations of the ultrasonic imaging apparatus 400 according to a user's command or a predetermined setting. Herein, the user's command may be input through a separate input unit 401. The controller 430 may control the pulser 431 to control operations of the ultrasound probe 410. More specifically, the controller 430 may generate a control signal corresponding to the frequency of ultrasonic waves that are to be irradiated, and transfer the generated control signal to the pulser 431.

The pulser 431 may generate a voltage for driving the ultrasonic device 411 of the ultrasound probe 410. In particular, the pulser 431 may generate a voltage having a predetermined amplitude and a predetermined frequency according to a control signal received from the controller 430.

The beamformer 432 may perform electronic beam scanning, steering, focusing, and/or apodizing on a plurality of channels of ultrasonic signals. A signal output from the ultrasonic receiver 412 may be amplified and converted by an amplifier (not shown) and an Analog-Digital Converter (ADC, not shown), before being transferred to the beamformer 432. The beamformer 432 may compensate for time differences between the plurality of channels of ultrasonic signals, and synthesize the plurality of channels of ultrasonic signals whose time differences have been compensated to generate a beam-formed signal.

The signal processor 433 may perform various signal processing functions on the beam-formed signal. The signal processor 433 may perform a filtering process for applying a filter to the beam-formed signal to remove other signals except for a specific bandwidth of signals, a harmonic imaging process for passing harmonic signals while removing fundamental frequency components, a detection process for converting a voltage of an ultrasonic signal from a radio frequency format to a video signal format, and/or a compression process for reducing differences in amplitude between ultrasonic signals. According to another exemplary embodiment, the signal processor 433 may be omitted, and the functions of the signal processor 433 may be performed by an image processor 440 which will be described below.

The signal beamformed by the beamformer 432 or the signal processed by the signal processor 433 may be transferred to the image processor 440.

The image processor 440 may include a noise processor 441, a correction value decider 442, an image corrector 443, a filter storage unit 444, and a filter setting unit 445. However, according to another exemplary embodiment, some of the above-mentioned components may be omitted.

The image processor 440 may generate an ultrasonic signal based on a signal received from the beamformer 432 or the signal processor 433.

The noise processor 441 may remove noise from an ultrasonic image, and then transfer the ultrasonic image from which noise has been removed to the correction value decider 442 and the image corrector 443. According to an exemplary embodiment, the noise processor 441 may remove noise from the image using one of various kinds of noise removing filters such as a speckle noise removing filter.

The correction value decider 442 may use a directional filter that can be set to be aligned in an arbitrary direction in order to detect an edge in the image, and acquire a plurality of pixel values of a plurality of pixels corresponding to the detected edge.

The correction value decider 442 may use a plurality of directional filters that can be set to be aligned in different respective directions.

The directional filters may include a Gabor filter, and the Gabor filter may be alignable in various directions according to a predetermined setting or a user's selection.

The directional filters may be transferred from the filter storage unit 444 to the correction value decider 442. The directions of the directional filters may be set by the filter setting unit 445.

According to an exemplary embodiment, the correction value decider 442 may divide the received image into a plurality of areas, and apply the directional filters to the individual areas, respectively, to acquire an edge. In this case, each area may be composed of one or more pixels.

If a plurality of pixel values of the detected edge are acquired, the correction value decider 442 may calculate a mean value of the plurality of pixel values corresponding to the edge. At this time, the correction value decider 442 may sum, if the pixel values are greater than zero, the pixel values, and then divide the sum by the total number of all pixels to thereby calculate a mean value of the plurality of pixel values. After the correction value decider 442 acquires the mean value of the plurality of pixel values, the correction value decider 442 may decide a correction value for each pixel in the image, by using the calculated mean value and the pixel value of the pixel.

According to an exemplary embodiment, the correction value decider 442 may determine a correction value that is inversely proportional to the mean value and that is proportional to a pixel value of an area or pixel to which the correction value is to be applied.

The correction value decider 442 may transfer the decided correction value to the image corrector 443.

The image corrector 443 may apply the correction value to the image in order to correct the image. For example, the image corrector 443 may multiply a correction value that corresponds to each pixel of the image by the pixel value of the pixel to thereby correct the image. As a result, a predetermined output image may be acquired.

The functions and operations of the correction value decider 442, the image corrector 443, the filter storage unit 444, and the filter setting unit 445 have been described above with reference to FIGS. 1 to 13, and accordingly, further descriptions thereof will be omitted.

The output image acquired by the image corrector 443 may be transferred to the storage unit 402 and/or to the display unit 403.

The image processor 440 may include a receiver (not shown) which is configured to receive signals from the beamformer 432 or the signal processor 443 of the ultrasonic imaging apparatus 400. The receiver may function as the input unit 2 of FIG. 1. The receiver may include various I/O interfaces provided in a computing device, such as a circuit mounted on a PCB, one or more input pins provided in a processor, and various input ports, a wired communication module to transmit/receive data using a communication cable, or a wireless communication module that can connect to a wireless communication network.

The image processor 440 may be implemented as a CPU or GPU installed inside the main body 420 or installed in a computing device, such as a workstation or a server, provided separately from the main body 420, as described above.

The ultrasonic imaging apparatus 400 that irradiates ultrasonic waves to the inside of a subject, receives echo ultrasonic waves reflected from a target area of the subject, and generates an ultrasonic image based on the echo ultrasonic waves has been described above. However, the ultrasonic imaging apparatus 400 is not limited to an apparatus using the method. For example, the ultrasonic imaging apparatus 400 may be a photoacoustic ultrasonic apparatus using photo-acoustic spectroscopy, or a doppler sonography apparatus using Doppler effect. However, the ultrasonic imaging apparatus 400 may be any other apparatus that can generate images using ultrasonic waves.

Figure 16:
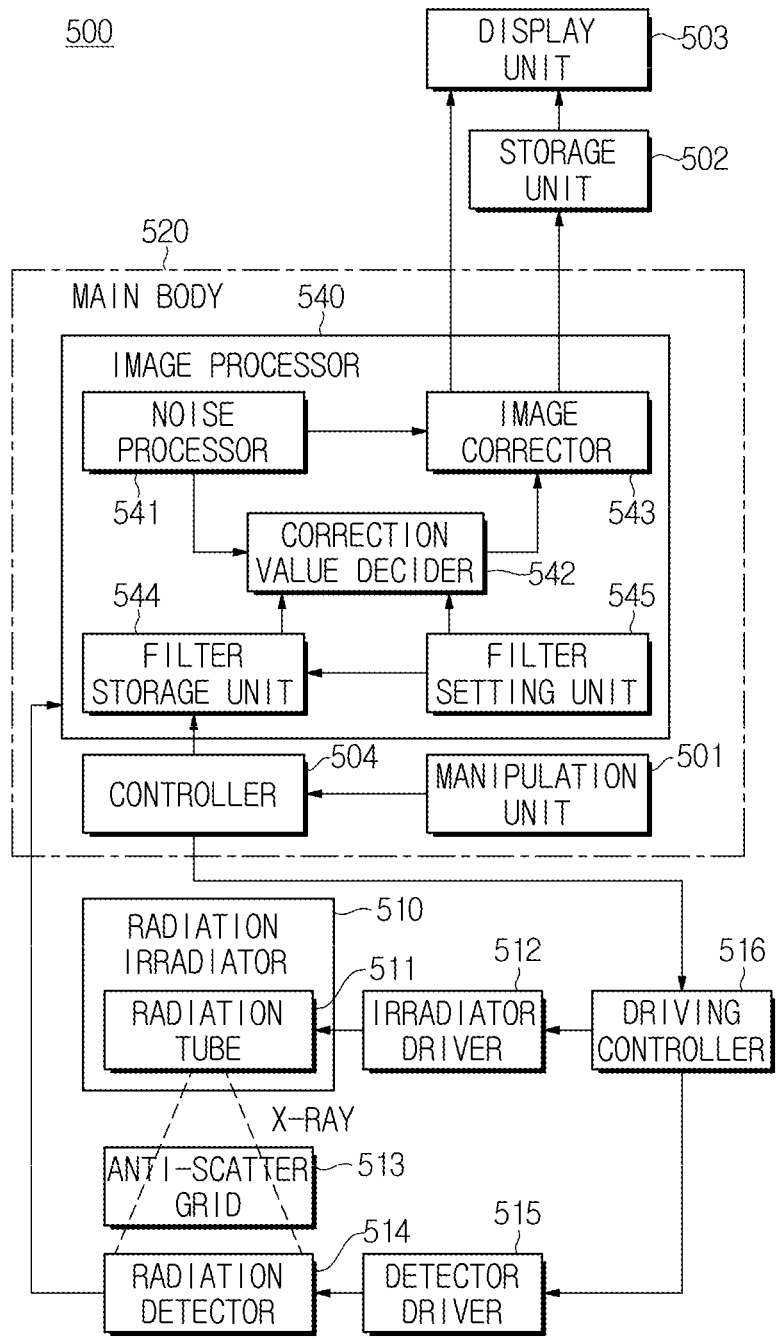
FIG. 16 is a block diagram of a radiography apparatus, according to an exemplary embodiment.

FIG. 16 is a block diagram of a radiography apparatus, according to an exemplary embodiment. In FIG. 16, an example of a Digital Radiography (DR) apparatus 500 is shown as a block diagram.

As shown in FIG. 16, the DR apparatus 500 may include a manipulation unit 501, a storage unit 502, a display unit 503, a controller 504, a radiation irradiator 510, an anti-scatter grid 513, a radiation detector 514, a driving controller 516, an irradiator driver 512, a detector driver 515, and an image processor 540. The controller 504 and the image processor 540 may be implemented using a processor installed in a main body or a workstation.

The radiation irradiator 510 may generate a predetermined energy level of radiation, and irradiate the predetermined energy level of radiation to a subject. Also, the radiation irradiator 510 may generate different energy levels of radiation, and irradiate the different energy levels of radiation to a subject to thus acquire a Multi-Energy X-ray (MEX) image. As shown in FIG. 16, the radiation irradiator 510 may include one or more radiation tubes 511 which are configured to generate radiation according to an applied tube voltage and tube current and to irradiate the radiation to the subject.

According to an exemplary embodiment, the radiation irradiator 510 may further include a collimator (not shown) provided in the radiation tube 511. The collimator may act to filter radiation, and may be made of a material, such as lead (Pb), that is capable of absorbing radiation. The collimator may include a blade to block radiation, and a transmission hole which can be opened/closed by the blade or whose opening size can be adjusted by the blade.

The anti-scatter grid 513 may absorb radiation that has propagated through and is scattered by the inside of a subject so as to cause only appropriate radiation to arrive at the radiation detector 514. The anti-scatter grid 513 may include a partition wall made of a material such as lead (Pb) that is capable of absorbing radiation, and a transmission hole partitioned by the partition wall. The anti-scatter grid 513 may absorb the scattered radiation by using the partition wall, and pass non-scattered radiation through the transmission hole so as to cause only appropriate radiation to arrive at the radiation detector 514.

The radiation detector 514 may detect radiation irradiated from the radiation irradiator 510 and then passed/not passed through a subject. The radiation detector 514 may convert the detected radiation into an electrical signal.

The radiation detector 514 may be a mono type device or a hybrid type device according to a material configuration method. The radiation detector 514 may use a direct conversion method of directly receiving radiation and then converting the received radiation into an electrical signal, or an indirect conversion method of generating photons according to received radiation and then converting the photons into an electrical signal, according to a method of converting radiation into an electrical signal. Also, the radiation detector 514 may use a charge integration method or a photon counting method, according to a method of acquiring an electrical signal.

A signal acquired by the radiation detector 514 may be transferred to the image processor 540.

At least one of the radiation irradiator 510 and the radiation detector 514 may be moved as necessary. In particular, at least one of the radiation irradiator 510 and the radiation detector 514 may be moved to a predetermined location by a robot arm in which the radiation irradiator 510 and the radiation detector 514 are installed, a rail and wheels, or the like. If the DR apparatus 500 is a Computerized Tomography (CT) apparatus, the radiation irradiator 510 and the radiation detector 514 may be rotated around a subject by a driving motor installed in a gantry in order to perform radiography.

The driving controller 516 may transfer control signals to the irradiator driver 512 and the detector driver 515 according to the control of the controller 504. The irradiator driver 512 may adjust a switch connected to a power source or the radiation tube 511 according to the control signal received from the controller 504 to adjust a voltage that is to be applied to the radiation tube 511. The detector driver 515 may control operations of the radiation detector 514, such as radiation detection or movement of the radiation detector 514, according to the control signal received from the controller 504.

The storage unit 502 may receive an output image, and store the received output image temporarily or non-temporarily. The storage unit 502 may be implemented as a solid state storage device, a disk storage device, an optical disk storage device, or a magnetic tape storage device.

The display unit 503 may display an output image received from an image corrector 543 or an output image stored in the storage unit 502 for a user. The display unit 503 may be implemented using one of various display devices, such as a PDP display, a LED display, a LCD, or a CRT display.

The controller 504 may control overall operations of the DR apparatus 500 according to a user's command input via the manipulation unit 501 or according a predetermined setting. The operations of the DR apparatus 500 may include operations of the radiation irradiator 510 and the radiation detector 514. According to an exemplary embodiment, the controller 504 may include a processor configured with one or more semiconductor chips.

The image processor 540 may create a radiation image based on signals received from the radiation detector 514, and also correct the created radiation image.

In order to correct the radiation image, the image processor 540 may include, as shown in FIG. 16, a noise processor 541, a correction value decider 542, the image corrector 543, a filter storage unit 544, and a filter setting unit 545.

However, some of the above-mentioned components may be omitted according to exemplary embodiments.

The noise processor 541 may remove noise from the radiation image, and transfer the radiation image from which noise has been removed to the correction value decider 542 and the image corrector 543. According to an exemplary embodiment, the noise processor 541 may use a speckle noise removing filter to remove noise.

The correction value decider 542 may detect an edge of the image by using one or more directional filters that are alignable in an arbitrary direction, and acquire a plurality of pixel values of a plurality of pixels corresponding to the detected edge. The correction value decider 542 may use a plurality of directional filters which are aligned in different respective directions. The direction filters may include a Gabor filter, and the Gabor filter may be set to be aligned in various directions according to a predetermined setting or a user's selection. The directional filters may be transferred from the filter storage unit 544 to the correction value decider 542, or may be set by the filter setting unit 545.

The correction value decider 542 may divide the received image into a plurality of areas, and apply the directional filters to the individual areas, respectively, to thus detect an edge.

If the plurality of pixel values that correspond to the detected edge are detected, the correction value decider 542 may calculate a mean value of the plurality of pixel values that correspond to the detected edge, and determine a correction value for each pixel in the image, by using the mean value and the pixel value of the pixel. At this time, the correction value decider 542 may determine a correction value that is inversely proportional to the mean value and that is proportional to a pixel value of an area or a pixel to which the correction value is to be applied.

The correction value decider 542 may transfer the decided correction value to the image corrector 543.

The image corrector 543 may apply the correction value to the image in order to correct the image.

The functions and operations of the correction value decider 542, the image corrector 543, the filter storage unit 544, and the filter setting unit 545 are the substantially same as those of the corresponding components described above with reference to FIGS. 1 to 13, and accordingly, detailed descriptions thereof will be omitted. However, the functions and operations of the correction value decider 542, the image corrector 543, the filter storage unit 544, and the filter setting unit 545 may be partially modified within a range that can be considered by one of ordinary skill in the art, according to exemplary embodiments.

The output image acquired by the image corrector 543 may be transferred to the storage unit 502 and/or to the display unit 503.

The image processor 540 may include a receiver (not shown) which is configured to receive signals transmitted from the radiation detector 514. In this case, the receiver may function as the input unit 2 shown in FIG. 1. The receiver may include various I/O interfaces provided in a computing device, such as a circuit mounted on a PCB, one or more input pins provided in a processor, and various input ports, a wired communication module to transmit/receive data using a communication cable, or a wireless communication module that can connect to a wireless communication network.

The image processor 540 may be implemented as a CPU or GPU installed inside the main body 520, or installed in a computing device, such as a workstation or a server, provided separately from the main body 520, as described above.

The DR apparatus 500 has been described above as an example of a radiography apparatus, however, the radiography apparatus is not limited to the DR apparatus. For example, the radiography apparatus may be Computed Tomography (CT), Full Field Digital Mammography (FFDM), a radiography apparatus for angiography, or a radiography apparatus using fluoroscopy. However, the radiography apparatus may be any other apparatus that can perform radiography.

Figure 17:
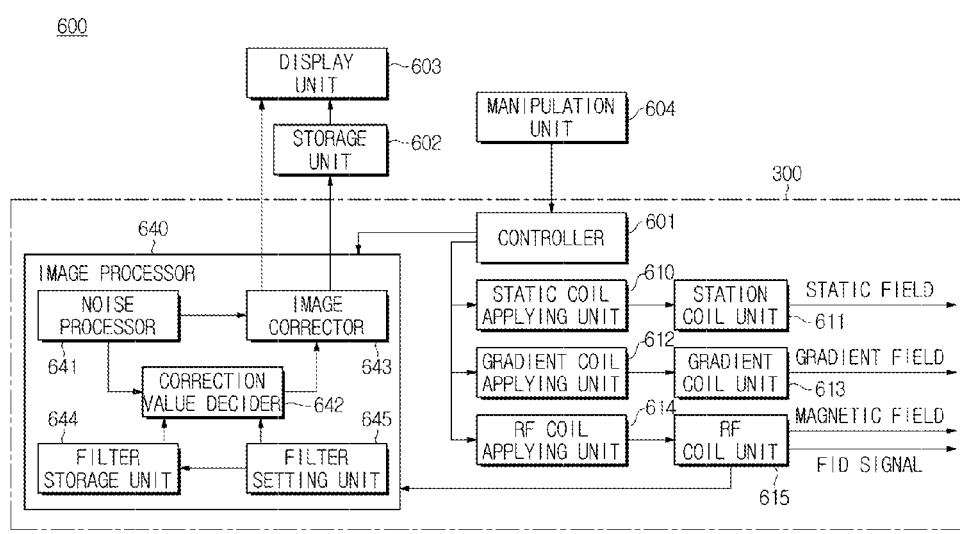
FIG. 17 is a block diagram of a Magnetic Resonance Imaging (MRI) apparatus, according to an exemplary embodiment.

FIG. 17 is a block diagram of a Magnetic Resonance Imaging (MRI) apparatus, according to an exemplary embodiment. Referring to FIG. 17, a MRI apparatus 600 may include a controller 601, a static coil applying unit 610, a static coil unit 611, a gradient coil applying unit 612, a gradient coil unit 613, a Radio Frequency (RF) coil applying unit 614, an RF coil unit 615, and an image processor 640.

The MRI apparatus 600 may provide a cavity which is empty space, at or around its center, and include a bore (not shown) which is a main body having a cylindrical shape. A subject such as a human body may be placed on a conveyance table and then conveyed into the cavity. In the bore, the static coil applying unit 610 and the static coil unit 611 may be installed. The gradient coil applying unit 612 may be installed in the bore, or worn on the entire or a part of a subject.

The static coil unit 611 may form a static magnetic field for magnetizing the atomic nucleus of elements (for example, hydrogen, phosphorus, sodium) that cause a MR phenomenon among elements distributed in a human body. The static magnetic field formed by the static coil unit 510 may be parallel to a direction in which the subject is conveyed. If the subject is a human body, a static magnetic field may be formed in a direction from the human body's head to the human body's legs. The static coil unit 611 may be made of a superconducting electromagnet or a permanent magnet.

The gradient coil unit 613 may form a spatially linear gradient field on the subject in the cavity to thus cause a change in uniformity of the magnetic field. Accordingly, the gradient coil unit 613 may spatially control the rotation frequencies or phases of magnetization vectors of the atomic nucleus of elements, such as hydrogen, phosphorus, and sodium, generated by the static magnetic field, when the magnetization vectors rotate on the traverse plane, so that a MR signal can be expressed in k-space which is a spatial frequency domain.

The RF coil unit 615 may form a high frequency magnetic field in the inside of the subject, or may receive FID signals induced according to a MR phenomenon generated in the inside of the subject. According to an exemplary embodiment, the RF coil unit 615 may include a transmitter coil which is configured to form a high frequency magnetic field, and a receiver coil which is configured to receive FID signals. According to another exemplary embodiment, the RF coil unit 615 may include a transceiver coil that can perform both a function of forming a high frequency magnetic field and a function of receiving FID signals.

The transmitter coil or the transceiver coil may form a high frequency magnetic field to rotate magnetization vectors formed by a static magnetic field horizontally on the traverse plane. The transmitter coil or the transceiver coil may form a magnetic field rotating at the Larmor frequency around the coil according to applied high-frequency current of the Larmor frequency band.

If a magnetic field is applied to a subject, the magnetic field may resonate with magnetization vectors in the subject in order to induce an electrical signal of a predetermined electromotive force in the receiver coil or the transceiver coil of the RF coil unit 615. If a sine wave of the Larmor frequency is demodulated based on the electrical signal induced in the receiver coil or the transceiver coil of the RF coil unit 615, a MR signal of a fundamental band may be acquired.

The electrical signal induced in the RF coil unit 615 may be transferred to the image processor 640.

The controller 601 may control overall operations of the MRI apparatus 600, according to a user's command input via the manipulation unit 604 or according to a pre-defined setting. In particular, the controller 601 may generate control signals according to a user's instruction or command or a pre-stored setting, and then transfer the control signals to the static coil applying unit 610, the gradient coil applying unit 612, and the RF coil applying unit 614.

The static coil applying unit 610, the gradient coil applying unit 612, and the RF coil applying unit 614 may apply current of predetermined voltages to the static coil unit 611, the gradient coil unit 613, and the RF coil applying unit 614, respectively, according to the control signals received from the controller 601, so that the MRI apparatus 600 can acquire a MR signal.

The controller 601, the static coil applying unit 610, the gradient coil applying unit 612, and the RF coil applying unit 614 may be implemented as a processor that can be configured with one or more semiconductor chips.

The image processor 640 may create a MR image based on a signal received from the RF coil applying unit 614, and correct the MR image.

In order to correct the MR image, the image processor 640 may include a noise processor 641, a correction value decider 642, an image corrector 643, a filter storage unit 644, and a filter setting unit 645. However, some of the above-mentioned components may be omitted.

The noise processor 641 may remove noise from the MR image, and then transfer the image from which noise has been removed to the correction value decider 642 and the image corrector 643. The noise processor 641 may use one of various kinds of noise removing filters. For example, the noise processor 641 may use a speckle noise removing filter to remove noise from the MR image.

The correction value decider 642 may use a directional filter that can be set to be aligned in an arbitrary direction, to detect an edge from the MR image, and acquire a plurality of pixel values of a plurality of pixels that correspond to the detected edge. In addition, the correction value decider 642 may use a plurality of directional filters, and in this case, the plurality of directional filters may be alignable in different respective directions.

The correction value decider 642 may divide the MR image into a plurality of areas, and then apply the directional filters to the individual areas, respectively, to thus detect an edge. The directional filters may be transferred from the filter storage unit 644 to the correction value decider 642. The directions of the directional filters may be set by the filter setting unit 645. The directional filters may include a Gabor filter, and the Gabor filter may be set to be aligned in various directions according to a predetermined setting or a user's selection.

If a plurality of pixel values that correspond to the detected edge are detected, the correction value decider 642 may calculate a mean value of the plurality of pixel values that correspond to the detected edge. At this time, the correction value decider 642 may sum, if the pixel values are greater than zero, the pixel values, and then divide the sum by the total number of pixels to thereby calculate a mean value of the plurality of pixel values.

After acquiring the mean value of the plurality of pixel values, the correction value decider 642 may determine a correction value for each pixel value in the image by using the mean value and the pixel value. According to an exemplary embodiment, the correction value decider 642 may determine a correction value that is inversely proportional to the mean value and that is proportional to a pixel value of an area or a pixel to which the correction value is to be applied.

The image corrector 643 may apply the determined correction value to the image in order to correct the image. For example, the image corrector 643 may multiply a correction value for each pixel in the image by the pixel value of the pixel in order to correct the image.

The functions and operations of the correction value decider 642, the image corrector 643, the filter storage unit 644, and the filter setting unit 645 are the substantially same as those of the corresponding components described above with reference to FIGS. 1 to 13, and accordingly, detailed descriptions thereof will be omitted.

An output image acquired by the image corrector 643 may be transferred to the storage unit 602 and/or to the display unit 603.

The image processor 640 may be implemented as a CPU or GPU installed in a main body of the MRI apparatus 600, or installed in a computing device, such as a workstation or a server, provided separately from the main body, as described above.

The storage unit 602 may receive the corrected image, and store the received image temporarily or non-temporarily. The storage unit 602 may be implemented as one or more solid state storage devices, a disk storage device, an optical disk storage device, or a magnetic tape storage device.

The display unit 603 may display the image received from the image corrector 643 or the image stored in the storage unit 602 for a user. The display unit 603 may display a predetermined image for a user, using one of various display devices, such as a PDP display, a LED display, a LCD, or a CRT display. Also, the display unit 603 may be implemented as a touch screen capable of receiving touch inputs.

As examples of the image capturing apparatus 97, the ultrasonic imaging apparatus 400, the DR apparatus 500, and the MRI apparatus 600 have been described above with reference to FIGS. 15 to 17, however, the image capturing apparatus 97 is not limited to the above-described apparatuses. For example, the image capturing apparatus 97 may be a camera, an infrared camera, or a camcorder. However, the image capturing apparatus 97 may include any other apparatus that can be considered by one of ordinary skill in the art.

Hereinafter, an image processing method will be described with reference to FIGS. 18 and 19.

Figure 18:
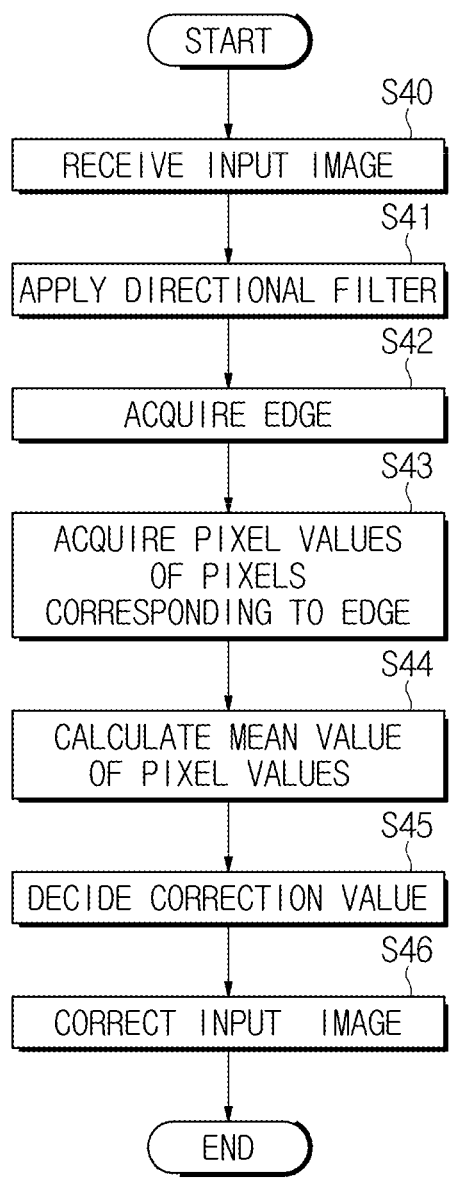
FIG. 18 is a flowchart illustrating an image processing method, according to an exemplary embodiment.

FIG. 18 is a flowchart illustrating an image processing method, according to an exemplary embodiment.

Referring to FIG. 18, in the image processing method according to an exemplary embodiment, first, an input image may be input to an image processing apparatus via an input pin, an I/O interface, a wired communication module, or a wireless communication module, in operation S40.

The image processing apparatus may apply a directional filter to the input image, in operation S41, in order to extract and acquire an edge from the input image, in operation S42.

At this time, the image processing apparatus may apply the directional filter to the entirety or a part of the input image or to individual pixels configuring the input image. The directional filter may include a Gabor filter, and the Gabor filter may be set variously according to a predetermined setting or a user's selection. For example, the Gabor filter may be set variously according to the above-described parameters $\lambda$, $\psi$, $\sigma$, $\gamma$, and $\theta$. The image processing apparatus may apply a plurality of different Gabor filters to the input image. The plurality of different Gabor filters may be acquired by changing various parameters, such as, for example, a rotation angle. The plurality of Gabor filters may have been stored in advance in separate storage space, or may be selected in real time according to a user's selection. By simultaneously or sequentially applying a plurality of different Gabor filters decided according to various rotation angles to the entirety or a part of the input image or to the individual pixels configuring the input image, a plurality of filtered images may be acquired. The image processing apparatus may detect an edge from the plurality of filtered images.

If an edge is acquired in operation S42, one or more pixel values that correspond to the edge, for example, a plurality of pixel values of a plurality of pixels that correspond to the edge may be acquired, in operation S43. According to an exemplary embodiment, after the pixel values that correspond to the edge are acquired, an image may be created according to the pixel values that correspond to the edge, and then noise may be removed from the image. In this case, image noise such as speckle noise can be suppressed.

Successively, the image processing apparatus may calculate a mean value of the pixel values that correspond to the edge, in operation S44. In particular, the image processing apparatus may calculate a mean value of the pixel values, based on the pixel values of the edge of the image from which the edge has been detected or the image from which the edge has been detected and then noise has been removed. The mean value of the pixel values may be an average brightness value of the pixel values of the corresponding pixels. The image processing apparatus may calculate an average brightness value of high frequency components added to the input image during edge enhancement. The mean value of the pixel values may be calculated by applying the algorithm shown in FIG. 10.

After the image processing apparatus calculates the mean value of the pixel values in operation S44, the image processing apparatus may determine a correction value for the input image, an area of the input image, or a pixel of the input image, using the mean value of the pixel values, and the pixel value of the input image, the area of the input image, or the pixel of the input image, to which the correction value is to be applied, in operation S45.

According to an exemplary embodiment, the image processing apparatus may determine a smaller correction value as the mean value of the pixel values corresponding to the edge is greater, and determine a greater correction value as the mean value of the pixel values corresponding to the edge is smaller. Further, the image processing apparatus may determine a greater correction value as a pixel value of a pixel or area to which the correction value is to be applied is greater, and determine a smaller correction value as the pixel value of the pixel or area to which the correction value is to be applied is smaller.

The image processing apparatus may apply the correction value to the input image, the area of the input image, or the pixel of the input image, to thereby correct the input image, in operation S46. Accordingly, a corrected output image may be acquired in which only the edge of the input image is selectively enhanced without enhancing noise in the flat area of the input image, that is, in an area having no (or nearly no) edge.

Figure 19:
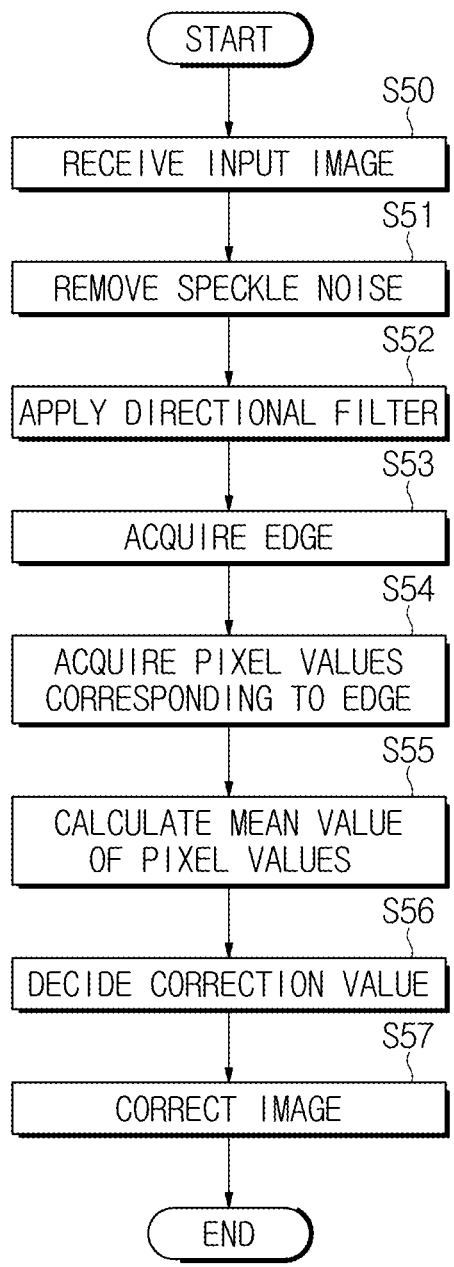
FIG. 19 is a flowchart illustrating an image processing method, according to another exemplary embodiment.

FIG. 19 is a flowchart illustrating an image processing method, according to another exemplary embodiment.

Referring to FIG. 19, in the image processing method according to another exemplary embodiment, first, an input image may be input to an image processing apparatus via an input pin, an I/O interface, a wired communication module, or a wireless communication module, in operation S50.

Successively, the image processing apparatus may remove various noise that exists in the input image, in operation S51. For example, the image processing apparatus may remove speckle noise by using a speckle noise removing filter.

Then, in operation S52, the image processing apparatus may apply a directional filter to the input image, in order to detect an edge from the input image in operation S53. The directional filter may include a Gabor filter.

After the image processing apparatus acquires the edge in operation S53, the image processing apparatus may acquire one or more pixel values that correspond to the edge, for example, a plurality of pixel values of a plurality of pixels that correspond to the edge, in operation S54.

Then, the image processing apparatus may calculate a mean value of the pixel values that correspond to the edge, in operation S55.

After the image processing apparatus calculates the mean value of the pixel values, the image processing apparatus may determine a correction value for the input image, an area of the input image, or a pixel of the input image, by using the mean value of the pixel values, and a pixel value of the input image, the area of the input image, or the pixel of the input image, to which the correction value is to be applied, in operation S56.

Then, the image processing apparatus may apply the correction value to the input image, the area of the input image, or the pixel of the input image to thus correct the input image, in operation S57.

The above-described operations S52 to S57 may be the substantially same as operations S41 to S46 described above with reference to FIG. 18. According to another exemplary embodiment, the above-described operations S52 to S57 may be partially modified from the operations S41 to S46 within a range that can be considered by one of ordinary skill in the art. Accordingly, detailed descriptions about the operations S52 to S57 will be omitted.

Hereinafter, a method of controlling an image capturing apparatus will be described with reference to FIG. 20.

Figure 20:
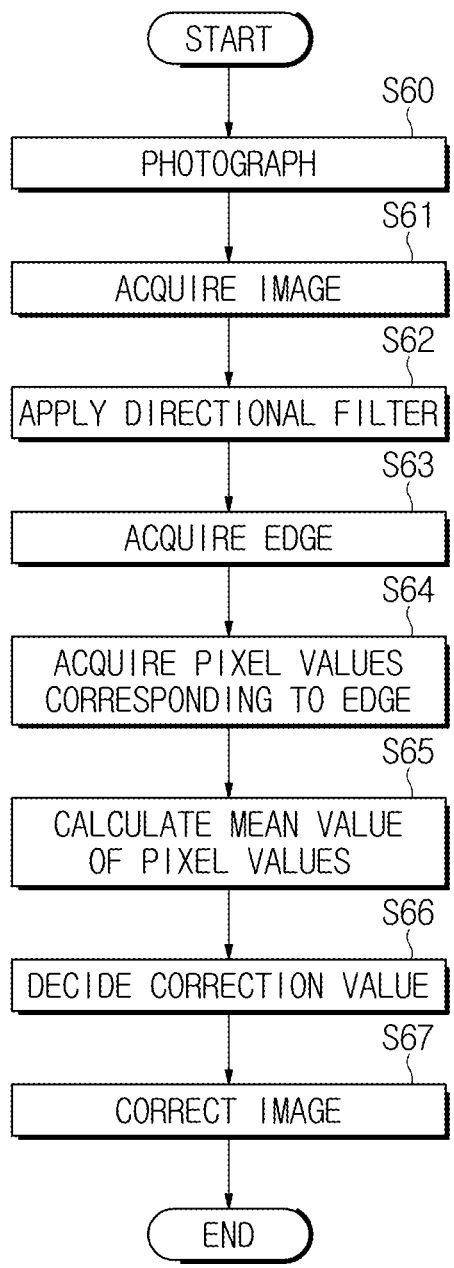
FIG. 20 is a flowchart illustrating a method of controlling an image capturing apparatus, according to an exemplary embodiment.

FIG. 20 is a flowchart illustrating a method of controlling an image capturing apparatus, according to an exemplary embodiment. The image capturing apparatus that can perform the control method shown in FIG. 20 may include any of an ultrasonic imaging apparatus, a radiography apparatus, a MRI apparatus, a camera, an infrared camera, or a camcorder. However, the image capturing apparatus may be any other image capturing apparatus that can be considered by one of ordinary skill in the art.

As shown in FIG. 20, the image capturing apparatus may photograph a subject using a predetermined method, in operation S60, in order to acquire an image of the subject, in operation S61.

The predetermined method of photographing the subject may vary based on the kind of the image capturing apparatus. For example, if the image capturing apparatus is an ultrasonic imaging apparatus, a subject may be photographed by irradiating ultrasonic waves or laser to a target area inside the subject to reflect the ultrasonic waves or the laser from the target area of the subject, then receiving the ultrasonic waves reflected or generated from the target area of the subject, amplifying ultrasonic signals (that is, analog signals) that are electrical signals corresponding to the received ultrasonic waves, converting the analog signals into digital signals, and then performing beamforming.

After the image capturing apparatus acquires the image of the subject, the image capturing apparatus may apply a directional filter to the acquired image, in operation S62, and detect an edge from the image according to the result of the application, in operation S63.

According to an exemplary embodiment, the image capturing apparatus may apply the direction filter to the entirety or a part of the image or to individual pixels of the image. Herein, the directional filter may include a Gabor filter. Also, according to an exemplary embodiment, before applying the directional filter to the image, the image capturing apparatus may remove noise from the image. For example, the image capturing apparatus may remove speckle noise from the image by using a speckle noise removing filter.

After the image capturing apparatus acquires the edge of the image in operation S63, the image capturing apparatus may acquire one or more pixel values that correspond to the edge, for example, a plurality of pixel values of a plurality of pixels that correspond to the edge, in operation S64, and then calculate a mean value of the pixel values that correspond to the edge, for example, the pixel values of the pixels that correspond to the edge, in operation S65.

After the image capturing apparatus calculates a mean value of the pixel values, for example, the pixel values of the pixels that correspond to the edge in operation S65, the image capturing apparatus may determine a correction value for the image, an area of the image, or a pixel of the image, by using the mean value of the pixel values, and the pixel value of the image, the area of the image, or the pixel of the image, to which the correction value is to be applied, in operation S66.

Then, the image capturing apparatus may apply the correction value to the image, the area of the image, or the pixel of the image, to thus correct the image, in operation S67. Accordingly, the image capturing apparatus may acquire a corrected image.

The above-described operations S61 to S67 may be the substantially same as operations S40 to S46 described above with reference to FIG. 18. According to another exemplary embodiment, the above-described operations S61 to S67 may be partially modified from the operations S40 to S46 within a range that can be considered by one of ordinary skill in the art. Accordingly, detailed descriptions about the operations S61 to S67 will be omitted.

According to the image processing apparatus, the image capturing apparatus, the image processing method, and the method of controlling the image capturing apparatus, as described above, it is possible to selectively enhance edges included in an image while maintaining the brightness of the image.

Further, according to the image processing apparatus, the image capturing apparatus, the image processing method, and the method of controlling the image capturing apparatus, as described above, when an image about an area of interest having clear edges and background filled with uniform data is input or acquired, an image in which only the edges of the area of interest are enhanced while maintaining the uniform data of the background can be acquired.

Although a few exemplary embodiments have been shown and described, it will be appreciated by those skilled in the art that changes may be made in these exemplary embodiments without departing from the principles and spirit of the present disclosure, the scope of which is defined in the claims and their equivalents.

What is claimed is:

1. An image processing apparatus comprising:
an input device via which an image is input; and
a processor configured to detect an edge of the image by applying at least one directional filter that is alignable in a direction with respect to the image, to calculate a mean value of a plurality of pixel values of a plurality of pixels that correspond to the edge, to determine a correction value that corresponds to each pixel of the image based on the calculated mean value, and to apply the determined correction value to the image in order to correct the image,
wherein the processor is further configured to determine the correction value as varying inversely with respect to the calculated mean value such that the correction value is determined to be smaller when the calculated mean value is greater, and the correction value is determined to be greater when the calculated mean value is smaller.

2. The image processing apparatus according to claim 1, wherein the at least one directional filter comprises a Gabor filter.

3. The image processing apparatus according to claim 1, wherein the processor is further configured to apply a plurality of directional filters which are aligned in different respective directions with respect to the image in order to acquire the plurality of pixels that correspond to the edge.

4. The image processing apparatus according to claim 1, wherein the processor is further configured to divide the image into a plurality of areas, and to apply the at least one directional filter to each of the plurality of areas in order to detect the edge of the image.

5. The image processing apparatus according to claim 1, wherein the processor is further configured to apply the correction value to the corresponding pixel of the image in order to acquire an output image.

6. The image processing apparatus according to claim 1, wherein the processor is further configured to remove noise from the image or from the edge of the image.

7. The image processing apparatus according to claim 6, wherein the processor is further configured to reduce a relatively smaller pixel value from among the plurality of pixel values, and to extend a relatively greater pixel value from among the plurality of pixel values.

8. The image processing apparatus according to claim 6, wherein the processor is further configured to perform speckle noise filtering.

9. An image processing apparatus comprising:
an input device via which an image is input; and
a processor configured to detect an edge of the image by applying at least one directional filter that is alignable in a direction with respect to the image, to calculate a mean value of a plurality of pixel values of a plurality of pixels that correspond to the edge, to determine a correction value that corresponds to each pixel of the image based on the calculated mean value, and to apply the determined correction value to the image in order to correct the image,
wherein the processor is further configured to determine a greater correction value for at least a first pixel of the image as a pixel value of the at least first pixel is greater, and to determine a smaller correction value for at least a second pixel of the image as a pixel value of the at least second pixel is smaller.

10. An image processing method comprising:
applying at least one directional filter that is alignable in a direction with respect to an image in order to detect an edge of the image;
acquiring a plurality of pixels that correspond to the edge;
calculating a mean value of a plurality of pixel values of the plurality of pixels, and determining a correction value that corresponds to the plurality of pixels based on the calculated mean value; and
applying the determined correction value to the image in order to correct the image,
wherein the determining the correction value comprises determining the correction value as varying inversely with respect to the calculated mean value such that the correction value is determined to be smaller when the calculated mean value is greater, and the correction value is determined to be greater when the calculated mean value is smaller.

11. The image processing method according to claim 10, wherein the at least one directional filter includes a Gabor filter.

12. The image processing method according to claim 10, wherein the applying the at least one directional filter comprises applying a plurality of directional filters which are aligned in different respective directions with respect to the image in order to acquire the plurality of pixels that correspond to the edge.

13. The image processing method according to claim 10, wherein the applying the at least one directional filter comprises dividing the image into a plurality of areas, and applying the at least one directional filter to each of the plurality of areas in order to detect the edge of the image.

14. The image processing method according to claim 10, wherein the applying the correction value to the image comprises applying the correction value to the corresponding pixel of the image in order to acquire an output image.

15. The image processing method according to claim 10, further comprising removing noise from the image or from the edge of the image.

16. The image processing method according to claim 15, wherein the removing the noise comprises reducing a relatively smaller pixel value from among the plurality of pixel values, and extending a relatively greater pixel value from among the plurality of pixel values.

17. The image processing method according to claim 15, wherein the removing the noise comprises performing speckle noise filtering.

18. An image processing method comprising:
applying at least one directional filter that is alignable in a direction with respect to an image in order to detect an edge of the image;
acquiring a plurality of pixels that correspond to the edge;
calculating a mean value of a plurality of pixel values of the plurality of pixels, and determining a correction value that corresponds to the plurality of pixels based on the calculated mean value; and
applying the determined correction value to the image in order to correct the image,
wherein the determining the correction value comprises determining a greater correction value for at least a first pixel of the image as a pixel value of the at least first pixel is greater, and determining a smaller correction value for at least a second pixel of the image as a pixel value of the at least second pixel is smaller.

* * * * *